(12) United States Patent
Rao et al.

(10) Patent No.: US 10,908,272 B2
(45) Date of Patent: Feb. 2, 2021

(54) REDUCED COMPLEXITY FFT-BASED CORRELATION FOR AUTOMOTIVE RADAR

(71) Applicant: UHNDER, INC., Austin, TX (US)

(72) Inventors: Raghunath K. Rao, Austin, TX (US); Curtis Davis, St. Louis, MO (US); Monier Maher, St. Louis, MO (US); Steve Borho, St. Louis, MO (US); Nikhilesh Bhagat, Austin, TX (US); Jean P. Bordes, St. Charles, MO (US)

(73) Assignee: Uhnder, Inc., Austin, TX (US)

( * ) Notice: Subject to any disclaimer, the term of this patent is extended or adjusted under 35 U.S.C. 154(b) by 402 days.

(21) Appl. No.: 15/689,273

(22) Filed: Aug. 29, 2017

(65) Prior Publication Data

US 2018/0231652 A1 Aug. 16, 2018

Related U.S. Application Data

(60) Provisional application No. 62/524,794, filed on Jun. 26, 2017, provisional application No. 62/457,394, filed on Feb. 10, 2017.

(51) Int. Cl.
*G01S 13/10* (2006.01)
*G01S 13/34* (2006.01)
(Continued)

(52) U.S. Cl.
CPC .............. *G01S 13/34* (2013.01); *G01S 7/288* (2013.01); *G01S 7/2921* (2013.01); *G01S 7/354* (2013.01);
(Continued)

(58) Field of Classification Search
CPC ................................ G01S 7/415; G01S 13/10
(Continued)

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0725480 11/2011
EP 2374217 4/2013
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Erin F Heard
*Assistant Examiner* — Helena H Seraydaryan
(74) *Attorney, Agent, or Firm* — Gardner Linn

(57) ABSTRACT

A radar sensing system for a vehicle includes a transmitter configured for installation and use on a vehicle and able to transmit radio signals. The radar sensing system also includes a receiver and a processor. The receiver is configured for installation and use on the vehicle and is able to receive radio signals that include transmitted radio signals reflected from objects in the environment. The processor samples the received radio signals to produce a sampled stream. The processor processes the sampled stream such that the sampled stream is correlated with various delayed versions of a baseband signal. The correlations are used to determine an improved range, velocity, and angle of targets in the environment.

30 Claims, 17 Drawing Sheets

(51) Int. Cl.

| | | |
|---|---|---|
| *G01S 13/38* | (2006.01) | |
| *G01S 13/28* | (2006.01) | |
| *G01S 13/931* | (2020.01) | |
| *G01S 13/58* | (2006.01) | |
| *G01S 7/292* | (2006.01) | |
| *G01S 7/35* | (2006.01) | |
| *G01S 13/32* | (2006.01) | |
| *G01S 7/288* | (2006.01) | |
| *G01S 7/40* | (2006.01) | |
| *G01S 7/41* | (2006.01) | |
| *G01S 13/522* | (2006.01) | |
| *G01S 13/90* | (2006.01) | |

(52) U.S. Cl.
CPC ............ *G01S 7/4004* (2013.01); *G01S 7/415* (2013.01); *G01S 13/10* (2013.01); *G01S 13/288* (2013.01); *G01S 13/325* (2013.01); *G01S 13/38* (2013.01); *G01S 13/522* (2013.01); *G01S 13/582* (2013.01); *G01S 13/584* (2013.01); *G01S 13/9011* (2013.01); *G01S 13/931* (2013.01); *G01S 2007/2883* (2013.01); *G01S 2007/356* (2013.01); *G01S 2013/93271* (2020.01); *G01S 2013/93272* (2020.01)

(58) Field of Classification Search
USPC ......................................................... 342/70
See application file for complete search history.

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,896,434 A | 7/1975 | Sirven | |
| 4,078,234 A | 3/1978 | Fishbein et al. | |
| 4,176,351 A | 11/1979 | De Vita et al. | |
| 4,566,010 A | 1/1986 | Collins | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,376,939 A * | 12/1994 | Urkowitz | G01S 7/42 |
| | | | 342/134 |
| 5,379,322 A | 1/1995 | Kosaka et al. | |
| 5,497,162 A | 3/1996 | Kaiser | |
| 5,508,706 A | 4/1996 | Tsou et al. | |
| 5,657,021 A | 8/1997 | Ehsani-Nategh et al. | |
| 5,657,023 A | 8/1997 | Lewis et al. | |
| 5,712,640 A | 1/1998 | Andou | |
| 5,724,041 A | 3/1998 | Inoue et al. | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,970,400 A | 10/1999 | Dwyer | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,288,672 B1 | 9/2001 | Asano et al. | |
| 6,307,622 B1 | 10/2001 | Lewis | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,975,246 B1 | 12/2005 | Trudeau | |
| 7,119,739 B1 | 10/2006 | Struckman | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,154,436 B2 | 4/2012 | Szajnowski | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 9,121,943 B2 | 9/2015 | Stirlin-Gallacher et al. | |
| 9,239,378 B2 | 1/2016 | Kishigami et al. | |
| 9,239,379 B2 | 1/2016 | Burgio et al. | |
| 9,282,945 B2 | 3/2016 | Smith et al. | |
| 9,335,402 B2 | 5/2016 | Maeno et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,720,073 B1 | 8/2017 | Davis et al. | |
| 9,753,121 B1 | 9/2017 | Davis | |
| 9,753,132 B1 | 9/2017 | Bordes et al. | |
| 9,772,397 B1 | 9/2017 | Bordes et al. | |
| 9,791,551 B1 | 10/2017 | Eshraghi et al. | |
| 9,791,564 B1 | 10/2017 | Harris et al. | |
| 9,806,914 B1 | 10/2017 | Bordes et al. | |
| 9,829,567 B1 | 11/2017 | Davis et al. | |
| 9,846,228 B2 | 12/2017 | Davis et al. | |
| 9,869,762 B1 | 1/2018 | Alland et al. | |
| 2001/0002919 A1 | 6/2001 | Sourour et al. | |
| 2002/0004692 A1 | 1/2002 | Nicosia et al. | |
| 2002/0044082 A1 | 4/2002 | Woodington et al. | |
| 2002/0075178 A1 | 6/2002 | Woodington et al. | |
| 2002/0118522 A1 | 8/2002 | Ho et al. | |
| 2002/0130811 A1 | 9/2002 | Voigtaender | |
| 2002/0147534 A1 | 10/2002 | Delcheccolo et al. | |
| 2002/0155811 A1 | 10/2002 | Prismantas | |
| 2003/0001772 A1 | 1/2003 | Woodington et al. | |
| 2003/0011519 A1 | 1/2003 | Breglia et al. | |

(56) References Cited

U.S. PATENT DOCUMENTS

| | | |
|---|---|---|
| 2003/0058166 A1 | 3/2003 | Hirabe |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0138802 A1 | 7/2004 | Kuragaki et al. |
| 2005/0069162 A1 | 3/2005 | Haykin |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0109175 A1 | 5/2007 | Fukuda |
| 2007/0120731 A1* | 5/2007 | Kelly, Jr. .............. G01S 7/021 342/159 |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0279303 A1 | 12/2007 | Schoebel |
| 2008/0208472 A1 | 8/2008 | Morcom |
| 2008/0272955 A1 | 11/2008 | Yonak et al. |
| 2009/0015459 A1 | 1/2009 | Mahler et al. |
| 2009/0015464 A1 | 1/2009 | Fukuda |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0267822 A1 | 10/2009 | Shinoda et al. |
| 2009/0289831 A1 | 11/2009 | Akita |
| 2009/0295623 A1 | 12/2009 | Falk |
| 2010/0019950 A1 | 1/2010 | Yamano et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0277359 A1 | 11/2010 | Ando |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1* | 12/2011 | Mizutani .............. G01S 13/32 342/147 |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0146834 A1* | 6/2012 | Karr .............. G01S 13/325 342/47 |
| 2012/0173246 A1 | 7/2012 | Choi et al. |
| 2012/0195349 A1 | 8/2012 | Lakkis |
| 2012/0257643 A1 | 10/2012 | Wu et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0285373 A1 | 9/2014 | Kuwahara et al. |
| 2014/0327566 A1 | 11/2014 | Burgio et al. |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Kuehnle |
| 2015/0226848 A1 | 8/2015 | Park |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2015/0331090 A1 | 11/2015 | Jeong et al. |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0124086 A1 | 5/2016 | Jansen et al. |
| 2016/0139254 A1 | 5/2016 | Wittenberg |
| 2016/0146931 A1 | 5/2016 | Rao et al. |
| 2016/0154103 A1* | 6/2016 | Moriuchi .............. G01S 13/931 342/70 |
| 2016/0238694 A1* | 8/2016 | Kishigami .............. G01S 7/023 |
| 2017/0010361 A1* | 1/2017 | Tanaka .................... G01S 19/31 |
| 2017/0023661 A1 | 1/2017 | Richert |
| 2017/0212213 A1* | 7/2017 | Kishigami .............. G01S 13/04 |
| 2017/0219689 A1 | 8/2017 | Hung et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

(56) References Cited

U.S. PATENT DOCUMENTS

2018/0095163 A1* 4/2018 Lovberg .................. G01S 7/023
2018/0175907 A1* 6/2018 Marr .................... H04L 27/2032

FOREIGN PATENT DOCUMENTS

| EP | 2821808 | 7/2015 |
|----|---------|--------|
| FR | 2751086 | 1/1998 |
| WO | WO2015175078 | 11/2015 |
| WO | WO2015185058 | 12/2015 |
| WO | WO2016/011407 | 1/2016 |
| WO | WO2016030656 | 3/2016 |
| WO | WO2017175190 | 10/2017 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

International Search Report and Written Opinion of the International Searching Authority from corresponding Patent Cooperation Treaty (PCT) Application No. PCT/IB2017/55188, dated Jan. 26, 2018.

* cited by examiner $x_0 = x_0^{B-1}$ | $x_1 = x_B^{2B-1}$ | $x_2 = x_{2B}^{3B-1}$ | $x_3 = x_{3B}^{4B-1}$ | $x_4 = x_{4B}^{5B-1}$ $a_0 = a_0^{B-1}$ | $a_1 = a_B^{2B-1}$ | $a_2 = a_{2B}^{3B-1}$ | $a_3 = a_{3B}^{4B-1}$

FIG. 12

REDUCED COMPLEXITY FFT-BASED CORRELATION FOR AUTOMOTIVE RADAR

CROSS REFERENCE TO RELATED APPLICATIONS

The present application claims the filing benefits of U.S. provisional applications, Ser. No. 62/524,794, filed Jun. 26, 2017, and Ser. No. 62/457,394, filed Feb. 10, 2017, which are both hereby incorporated by reference herein in their entireties.

FIELD OF THE INVENTION

The present invention is directed to radar systems, and more particularly to radar systems for vehicles.

BACKGROUND OF THE INVENTION

The use of radar to determine range and velocity of objects in an environment is important in a number of applications including automotive radar and gesture detection. There may be multiple radar systems embedded into an automobile. Each of these could employ the ideas contained in the present disclosure. Each of these could also employ multiple transmitters, receivers, and antennas. A radar system typically operates by transmitting signals from one or more transmitters and then listening for the reflection of that signal from objects in the environment at one or more receivers. By comparing the transmitted signal with the received signal, a radar system can determine the distance to different objects. Using multiple transmissions, the velocity of an object can be determined. Using multiple transmitters and/or receivers, the angle (azimuth and/or elevation) of an object can be estimated.

SUMMARY OF THE INVENTION

The present invention provides methods and a system for achieving better performance in a radar system implemented as a modulated continuous wave radar. An exemplary radar system of the present invention computes various correlations with reduced complexity. Exemplary embodiments accomplish this by performing the correlation processing in the frequency domain, such that the transmitted signal and the received signal are correlated in the frequency domain.

A radar sensing system for a vehicle in accordance with an embodiment of the present invention includes at least one transmitter, at least one receiver, at least one antenna, memory, and a controller. The at least one transmitter is configured for installation and use on a vehicle and transmits radio signals. The transmitted radio signals are generated by up-converting a baseband transmitted signal. The at least one receiver is configured for installation and use on the vehicle and receives radio signals which include transmitted radio signals reflected from objects in the environment. The reflected radio signals are down-converted, and then sampled and quantized using an analog-to-digital converter (ADC) to produce possibly complex baseband samples. The resulting signal from the ADC is processed by a digital processor. The digital processor processes the received signal and transmitted signal in the frequency domain in order to produce a subset of correlations corresponding to a set of possible delays of the transmitted signal. The samples are converted into the frequency domain through the use of a Fourier transform operation.

A radar sensing system for a vehicle in accordance with an embodiment of the present invention includes a transmit pipeline comprising at least one transmitter configured to transmit radio signals, a receive pipeline configured for installation and use on the vehicle. The receive pipeline comprises at least one receiver configured to receive radio signals that include the transmitted radio signals reflected from objects in the environment. Each of the at least one receiver comprises at least one analog-to-digital converter (ADC) configured to convert the received radio signals to digital received samples. The digital received samples are time domain received samples. Each of the at least one receiver is configured to correlate the received radio signals after the time domain received samples of the received radio signals have been converted into frequency domain received samples via a Fourier transform type of operation.

A method of correlating received samples in a radar system for a vehicle in accordance with an embodiment of the present invention includes providing a radar system that includes (i) at least one transmitter configured for installation and use on a vehicle and configured to transmit radio signals, and (ii) at least one receiver configured for installation and use on the vehicle and configured to receive radio signals that include the transmitted radio signals reflected from objects in the environment. The radio signals received by each of the at least one receiver are converted into digital received samples. The samples are converted using at least one analog-to-digital converter (ADC) as part of the at least one receiver. The digital received samples are time domain received samples. The time domain received samples of the received radio signals are converted into frequency domain received samples via a Fourier transform type of operation. The frequency domain received samples are multiplied by a frequency domain version of the transmitted signal at each of the at least one receiver.

A radar sensing system for a vehicle in accordance with an embodiment of the present invention includes a transmitter and a receiver. The transmitter is configured for installation and use on a vehicle and configured to transmit modulated radio signals. The radio signals are modulated via a spreading code. The receiver is configured to receive radio signals that include the transmitted radio signals reflected from objects in the environment. The receiver includes a first analog-to-digital converter (ADC) that is configured to convert the received radio signals into the received samples. The received samples are time domain received samples. The receiver includes a first Fourier transform module that is configured to convert the time domain received samples into frequency domain received samples. The receiver includes a product module configured to multiply the frequency domain received radio signals with the corresponding transmitted signal. The product module is configured to output processed samples. The receiver further comprises an inverse Fourier transform type of module configured to convert the processed samples from the frequency domain to the time domain.

In an aspect of the present invention, the Fourier transform operation may be performed through the use of a fast Fourier transform.

In an aspect of the present invention, a receiver is configured to divide received samples into blocks of samples, where a size of a block is smaller than a length of the spreading code.

In an aspect of the present invention, a receiver is configured to process a code sample either before or after the Fourier transform before the code sample is multiplied by the frequency domain samples of the received radio signals.

These and other objects, advantages, purposes and features of the present invention will become apparent upon review of the following specification in conjunction with the drawings.

BRIEF DESCRIPTION OF THE DRAWINGS

FIG. 12 illustrates received samples from an analog-to-digital converter that are organized into blocks, with the code values also organized into blocks in accordance with the present invention;

DESCRIPTION OF THE PREFERRED EMBODIMENTS

Figure 1:
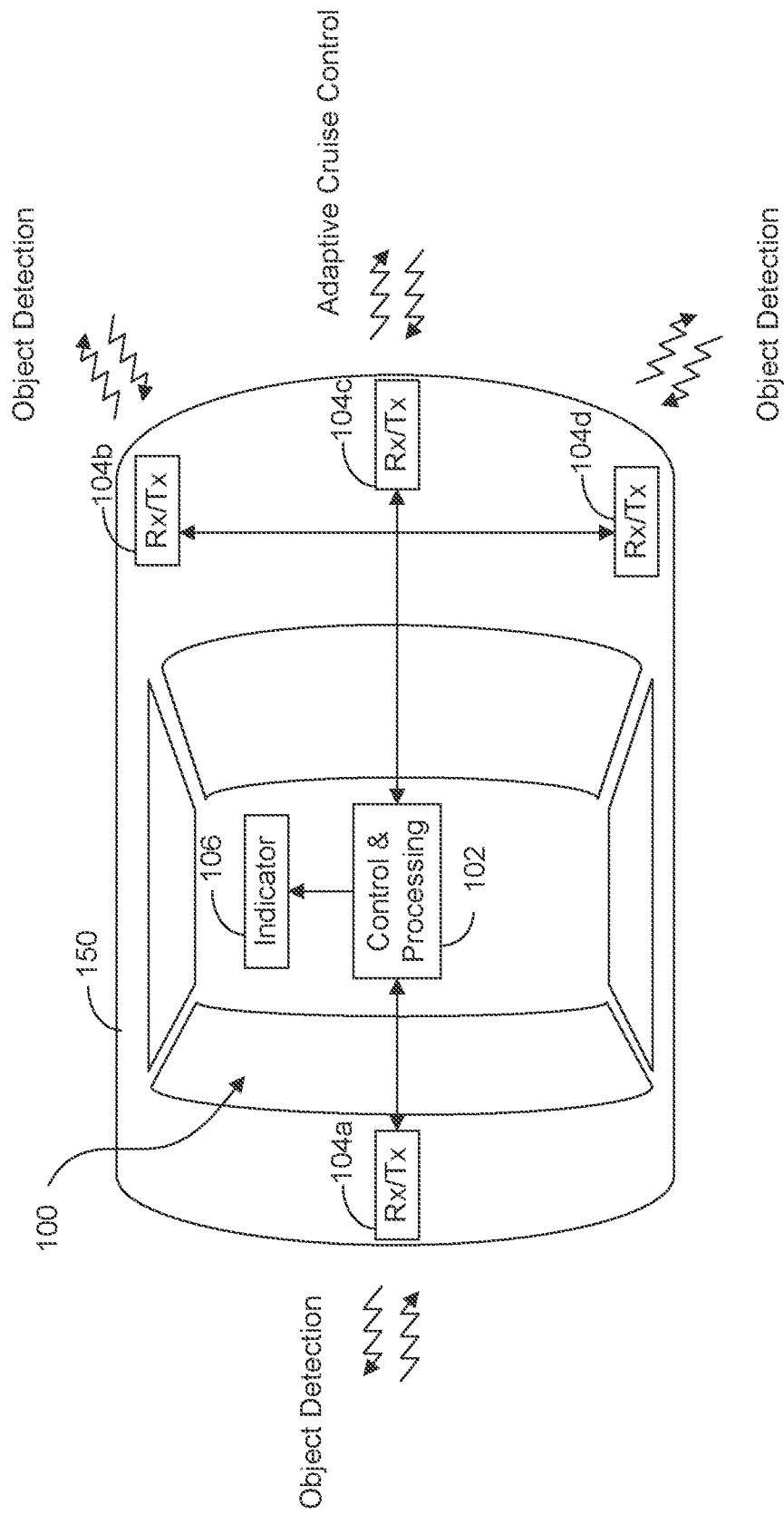
FIG. 1 is a plan view of an automobile equipped with a radar system in accordance with the present invention.

The present invention will now be described with reference to the accompanying figures, wherein numbered elements in the following written description correspond to like-numbered elements in the figures. Methods and systems of the present invention may achieve better performance from an exemplary radar system by reducing the complexity needed to compute the correlation values over a selection of delays. As discussed herein, a high-throughput correlation is provided through the use of a Fourier transform operation which converts complex samples into the frequency domain, such that the correlation can be performed in the frequency domain.

There are several types of signals used in different types of radar systems. A radar system may transmit a continuous signal or a pulsed signal. In a pulsed radar system a signal is transmitted for a short duration during a first time period and then no signal is transmitted for a short duration during a subsequent second time period. This is repeated over and over. When the signal is not being transmitted, a receiver listens for echoes or reflections from objects in the environment. Often a single antenna is used for both a transmitter and a receiver, where the radar transmits with the transmitter on the single antenna and then listens with the receiver, via the same antenna, for a radio signal reflected from objects in the environment. This process is then repeated.

Another type of radar system is known as a continuous wave radar system where a signal is continuously transmitted. There may be an antenna for transmitting and a separate antenna for receiving. One type of continuous radar signal is known as a frequency-modulated continuous waveform (FMCW). In an FMCW radar system, the transmitter of the radar system sends a continuous sinusoidal signal in which the frequency of the signal varies. This is sometimes called a chirp radar system. Mixing (multiplying) the radio signal reflected from a target/object with a replica of the transmitted signal results in a CW signal with a frequency that represents the distance between the radar transmitter/receiver and the target. For example, by measuring the time difference between when a certain frequency was transmitted and when the received signal contained that frequency, the range to an object can be determined. By sweeping up in frequency and then down in frequency, the Doppler frequency can also be determined.

Another type of radar signal is known as a phase-modulated continuous waveform (PMCW). For this type of signal, a phase of a radio signal to be transmitted is varied according to a certain pattern or code, sometimes called the spreading code, and is known at the PMCW radar receiver. The transmitted signal is phase modulated by mixing a baseband signal (e.g., with two values +1 and −1) with a local oscillator to generate a transmitted signal with a phase that is changing corresponding to the baseband signal. Sometimes, the phase during a given time period (called a chip period or chip duration) is one of a finite number of possible phases. A spreading code consisting of a sequence of chips, (e.g., +1, +1, −1, +1, −1, . . . ) that is mapped (e.g., +1→0, −1→π radians) into a sequence of phases (e.g., 0,0, π, 0, π, π, . . . ), can be used to modulate a carrier to generate the radio signal. The rate at which the phase is modulated determines the bandwidth of the transmitted signal and is called the chip rate.

In a PMCW radar system, the receiver can determine distance to objects by performing correlations of the received signal with time-delayed versions or replicas of the transmitted signal and looks for peaks in the correlations. A time-delay of the transmitted signal that yields peaks in the correlation corresponds to the delay of the transmitted signal when reflected off an object. The distance to the object is found from that delay and the speed of light.

The spreading code (used to phase modulate the radio signal before transmission) could be a periodic sequence or could be a pseudo-random sequence with a very large period so that it appears to be a nearly random sequence. The spreading code could be a sequence of complex numbers. The resulting modulated signal has a bandwidth that is proportional to the rate at which the phase changes, called the chip rate, which is the inverse of the chip duration. By comparing the return signal to the transmitted signal, the receiver can determine the range and the velocity of reflected objects. For a single transmitter, a sequence of chip values that form the code or spreading code that has good autocorrelation properties is required so that the presence of ghost or false targets are minimized.

FIG. 1 illustrates an exemplary radar system 100 configured for use in a vehicle 150. In an aspect of the present invention, a vehicle 150 may be an automobile, truck, or bus, etc. The radar system 100 may utilize multiple radar systems (e.g., 104a-104d) embedded into an automobile as illustrated in FIG. 1. Each of these radar systems may employ multiple transmitters, receivers, and antennas. These signals are reflected from objects (also known as targets) in the environment and received by one or more receivers of the radar system. A transmitter-receiver pair is called a virtual radar (or sometimes a virtual receiver). As illustrated in FIG. 1, the radar system 100 may comprise one or more transmitters and one or more receivers 104a-104d for a plurality of virtual radars. Other configurations are also possible. FIG. 1 illustrates the receivers/transmitters 104a-104d placed to acquire and provide data for object detection and adaptive cruise control. As illustrated in FIG. 1, a controller 102 receives and the analyzes position information received from the receivers 104a-104d and forwards processed information (e.g., position information) to, for example, an indicator 106 or other similar devices, as well as to other automotive systems. The radar system 100 (providing such object detection and adaptive cruise control or the like) may be part of an Advanced Driver Assistance System (ADAS) for the automobile 150.

Figure 2A:
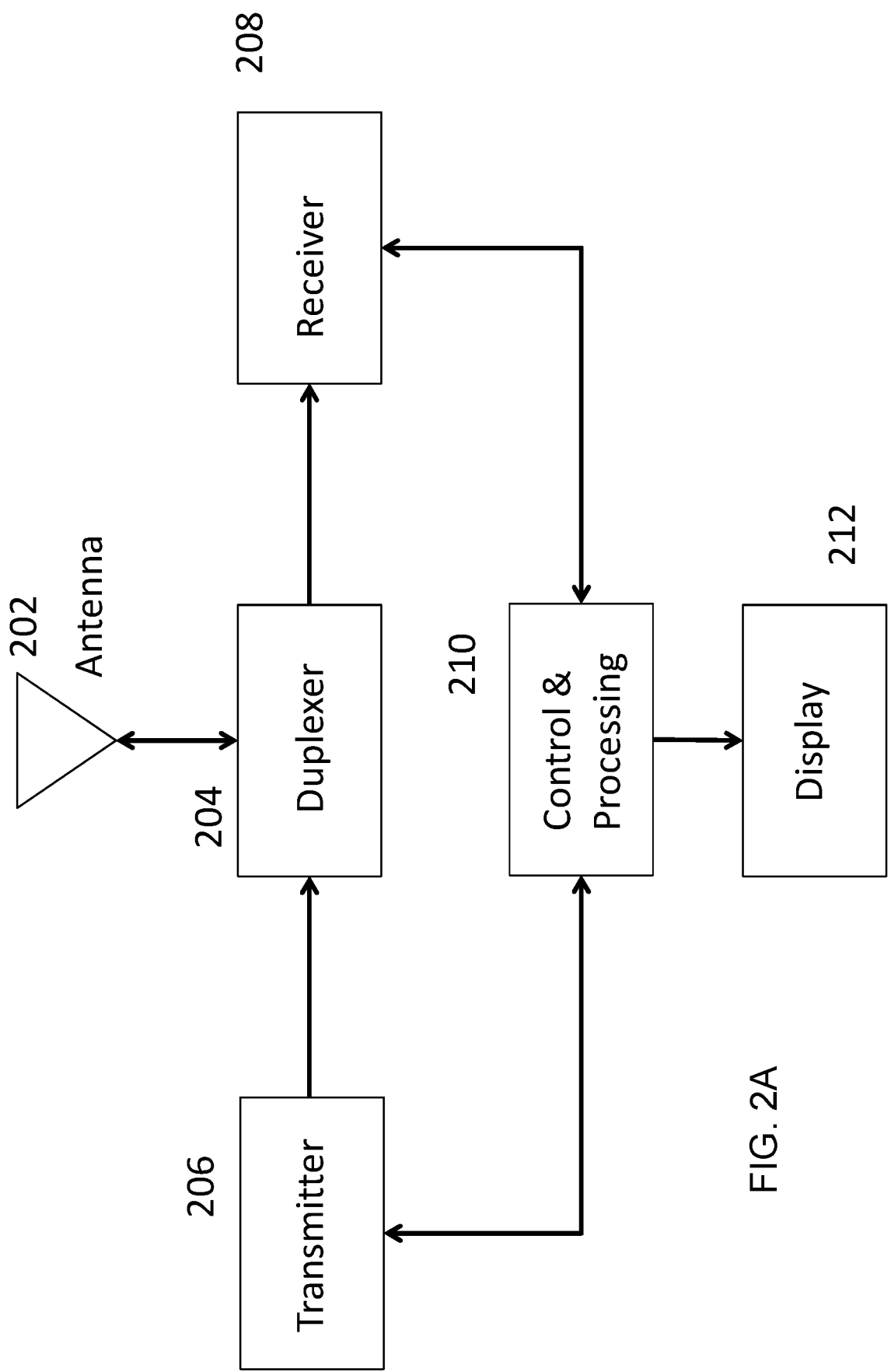
FIG. 2A and FIG. 2B are block diagrams of a single transmitter and a single receiver in a radar system.
Figure 2B:
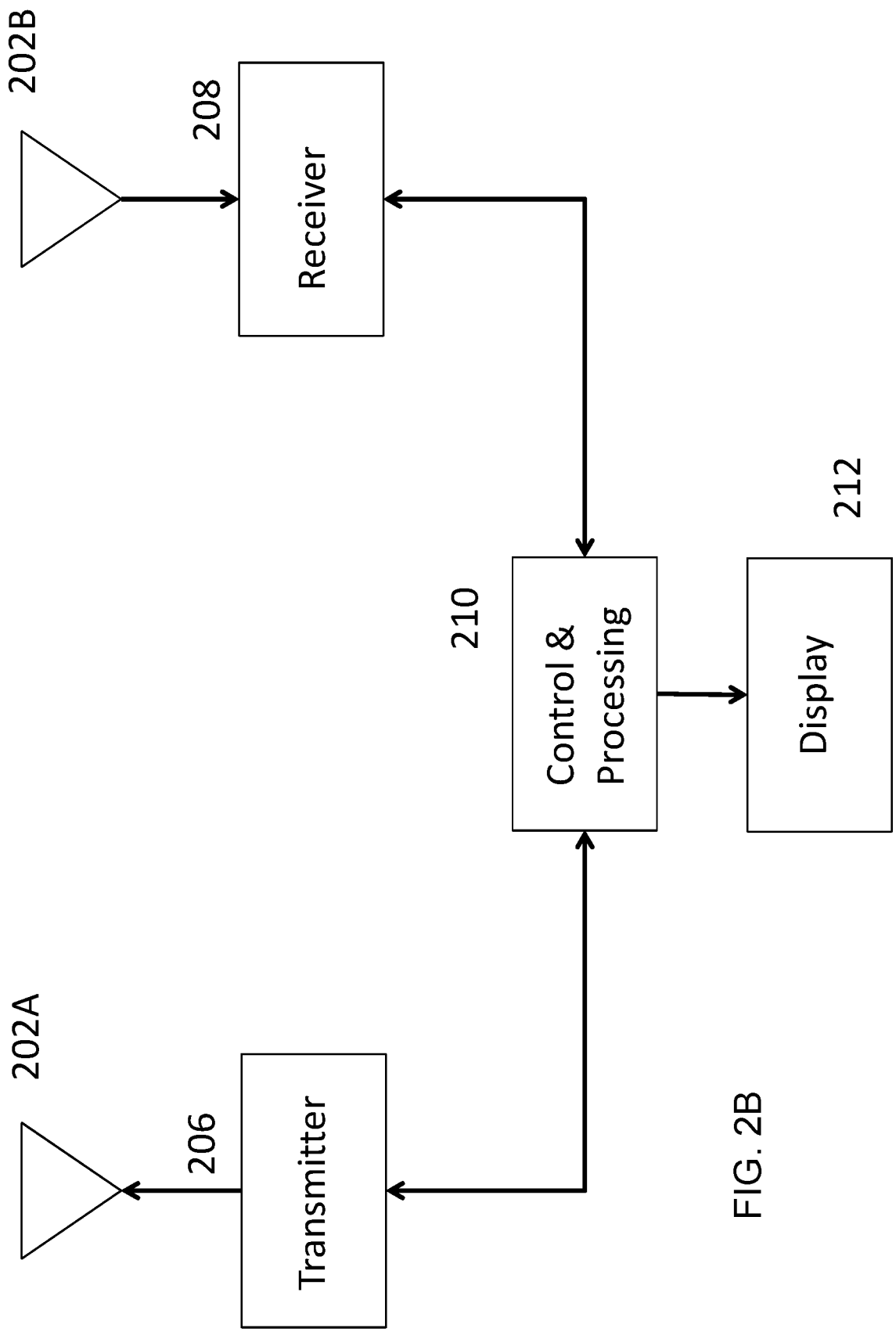

There are several ways to implement a radar system. One way, illustrated in FIG. 2A uses a single antenna 202 for both transmitting and receiving radio signals. The antenna 202 is connected to a duplexer 204 that routes the appropriate signal from the antenna 202 to a receiver 208 or routes the signal from the transmitter 206 to the antenna 202. A processor 210 controls the operation of the transmitter 206 and the receiver 208 and estimates the range and velocity of objects in the environment. A second way, illustrated in FIG. 2B, uses a pair of antennas 202A, 202B for separately transmitting and receiving, respectively. A processor 210 performs the same basic functions as in FIG. 2A. In each case there may be a display 212 to visualize the location of objects in the environment.

Figure 3:
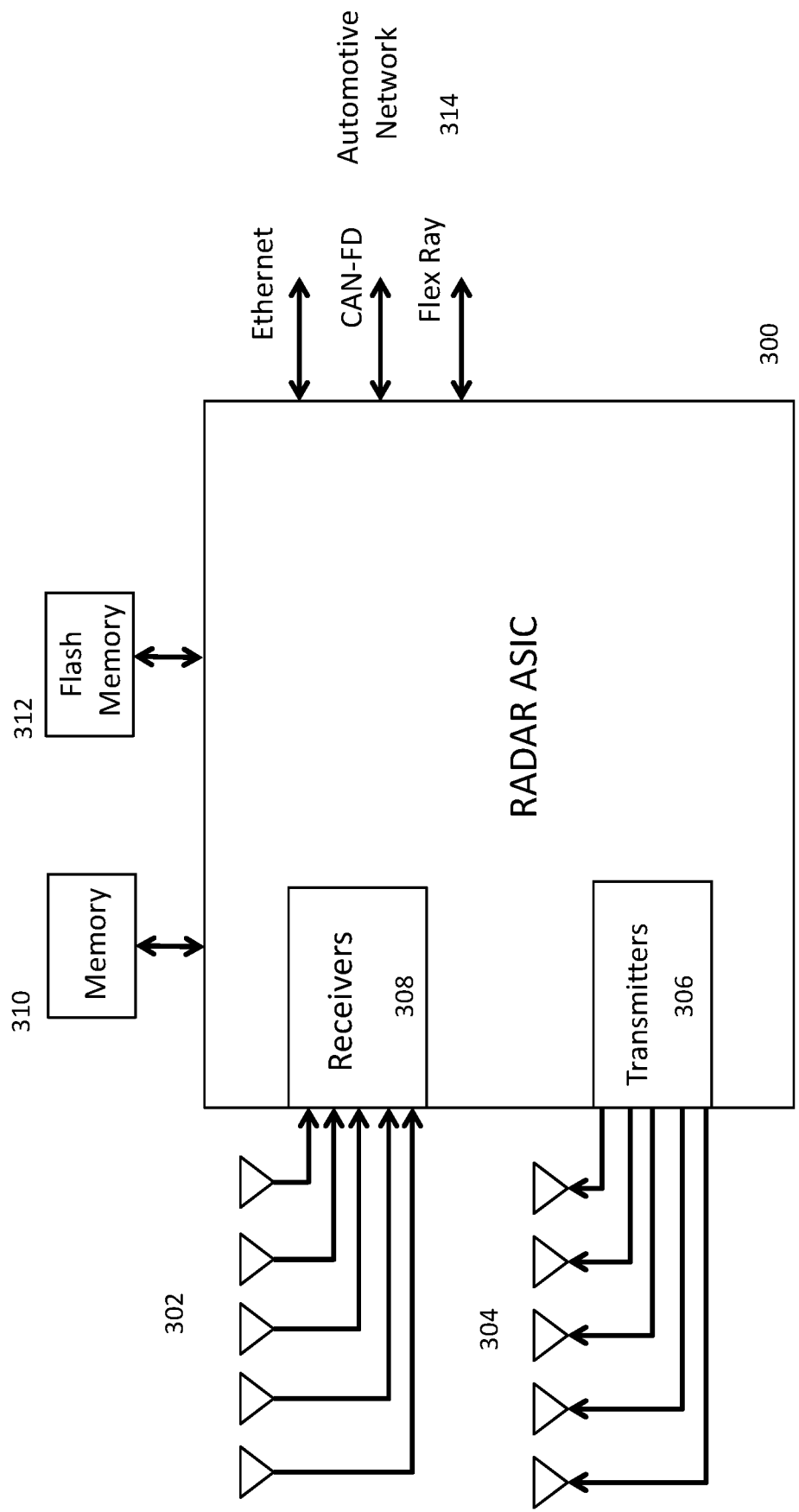
FIG. 3 is a block diagram of a radar system with multiple transmitters and multiple receivers.

A radar system with multiple antennas, transmitters, and receivers is illustrated in FIG. 3. Using multiple antennas 302, 304 allows the radar system 300 to determine an angle (azimuth or elevation or both) of targets in the environment. Depending on the geometry of the antenna system, different angles (e.g., azimuth or elevation) can be determined.

The radar system 300 may be connected to a network via an Ethernet connection or other types of network connections 314, such as, for example, CAN-FD and FlexRay. The radar system 300 will have memory 310, 312 to store software and data used for processing the radio signals in order to determine range, velocity and location of objects. Memory 310, 312 can also be used to store information about targets in the environment. There may also be processing capability contained in the ASIC 208 apart from the transmitters 203 and receivers 204.

Figure 4:
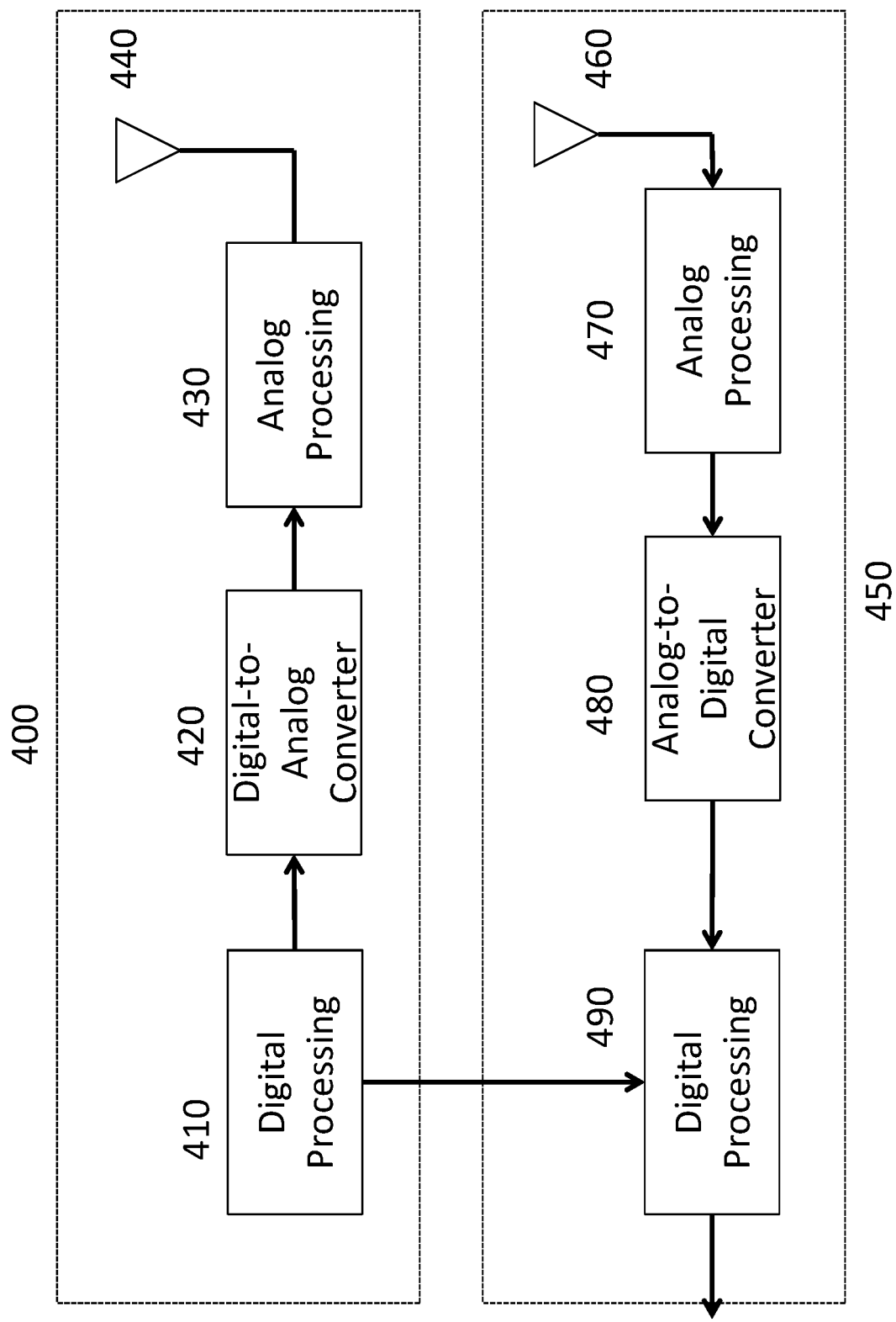
FIG. 4 is a block diagram illustrating the basic processing blocks of a transmitter and a receiver in a radar system in accordance with the present invention.

A basic block diagram of an exemplary PMCW system with a single transmitter and a single receiver is illustrated in FIG. 4. The transmitter 400 consists of a digital processor 410, which includes a digital signal generator. The digital processor 410 output is the input to a digital-to-analog converter (DAC) 420. The output of the DAC 420 is up-converted to an RF signal and amplified by an analog processing unit 430. The resulting upconverted and amplified radio signal is then transmitted via antenna 440. The digital signal generator of the digital processor 410 is configured to generate a baseband signal. An exemplary baseband signal might consist of repeated sequences of random or pseudo-random binary values for one transmitter, e.g., (−1, −1, −1, −1, 1, 1, 1, −1, 1, 1, −1, −1, 1, −1, 1), although any sequence (including non-binary sequences and non-periodic sequences) could be used, and different sequences could be used for different transmitters. Each value of the sequence is often called a chip. A chip would last a certain length of time called a chip duration. The inverse of the chip duration, denoted by $T_c$, is the chip rate, denoted by $R_c$. The sequence of chips could repeat every $L_c$ chips in which case the sequence is said to be periodic and $L_c$ is said to be the length or period. In an exemplary aspect of the present invention, the sequences of random binary values may be provided by a truly random number generator or by a combination of the truly random number generator and a pseudorandom number generator. The use of a truly random number generator and a pseudorandom number generator are explained in more detail in U.S. Pat. No. 9,575,160, which is hereby incorporated by reference herein in its entirety. The receiver 400, as illustrated in FIG. 4, consists of a receiving antenna 460, an analog processing unit 470 that amplifies the received signal and mixes the signal to a baseband signal. This is followed by an analog-to-digital converter (ADC) 480 and then a digital processor 490 which provides digital baseband processing. There is also a control processor (not shown) that controls the operation of the transmitter 400 and the receiver 450. The baseband processing will process the received signal and may generate data that can be used to determine range, velocity and angle of objects in the environment.

Correlation in a PMCW Radar:

The receiver in a radar system that uses phase-modulated continuous wave (PMCW) signals correlates the received signal with delayed versions of the transmitted signal. Here the "received signal" is a received radio signal that is down-converted, sampled and quantized (i.e., the signal at the input of the digital processing module 490 of the receiver 450), while the "transmitted signal" is a baseband version of the original transmitted signal (i.e., the signal from the digital processor 410 communicated to the digital processing module 490 in the radar system). An object at a certain distance will reflect the transmitted signal and the reflected signal will arrive at the receiver with a delay that corresponds to a propagation delay between the radar transmitter, the object, and the radar receiver.

Figure 5:
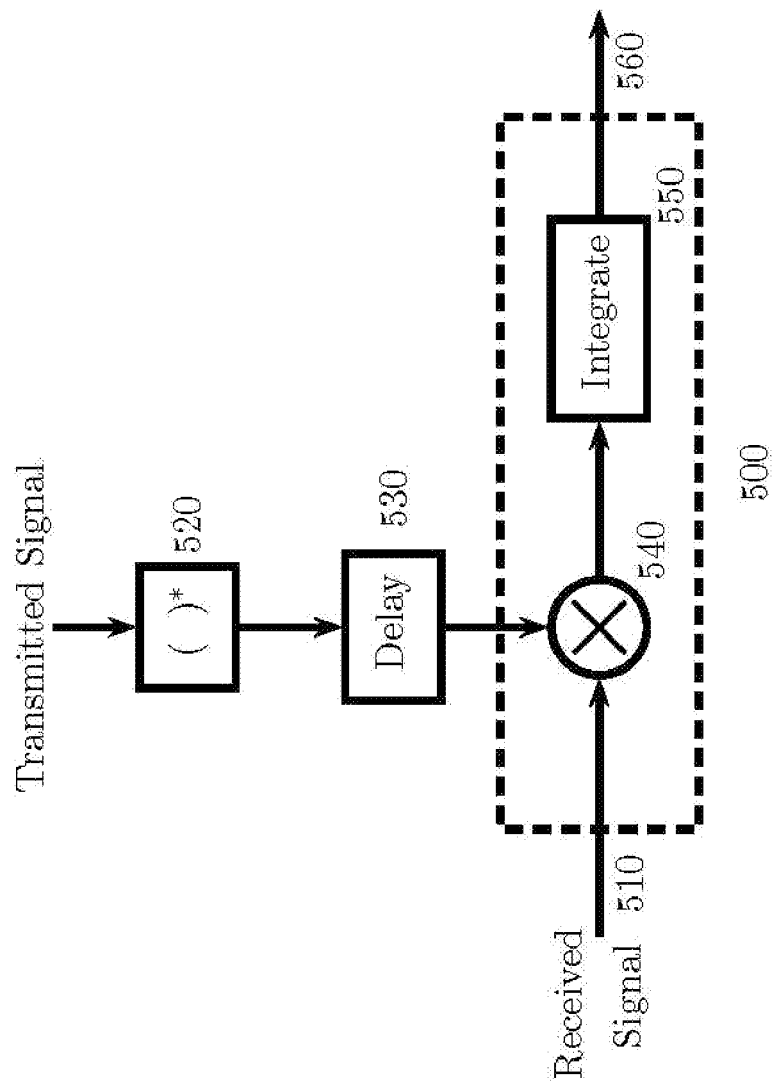
FIG. 5 is a block diagram illustrating the basic processing blocks of a correlator as used in a radar receiver in accordance with the present invention.
Figure 6:
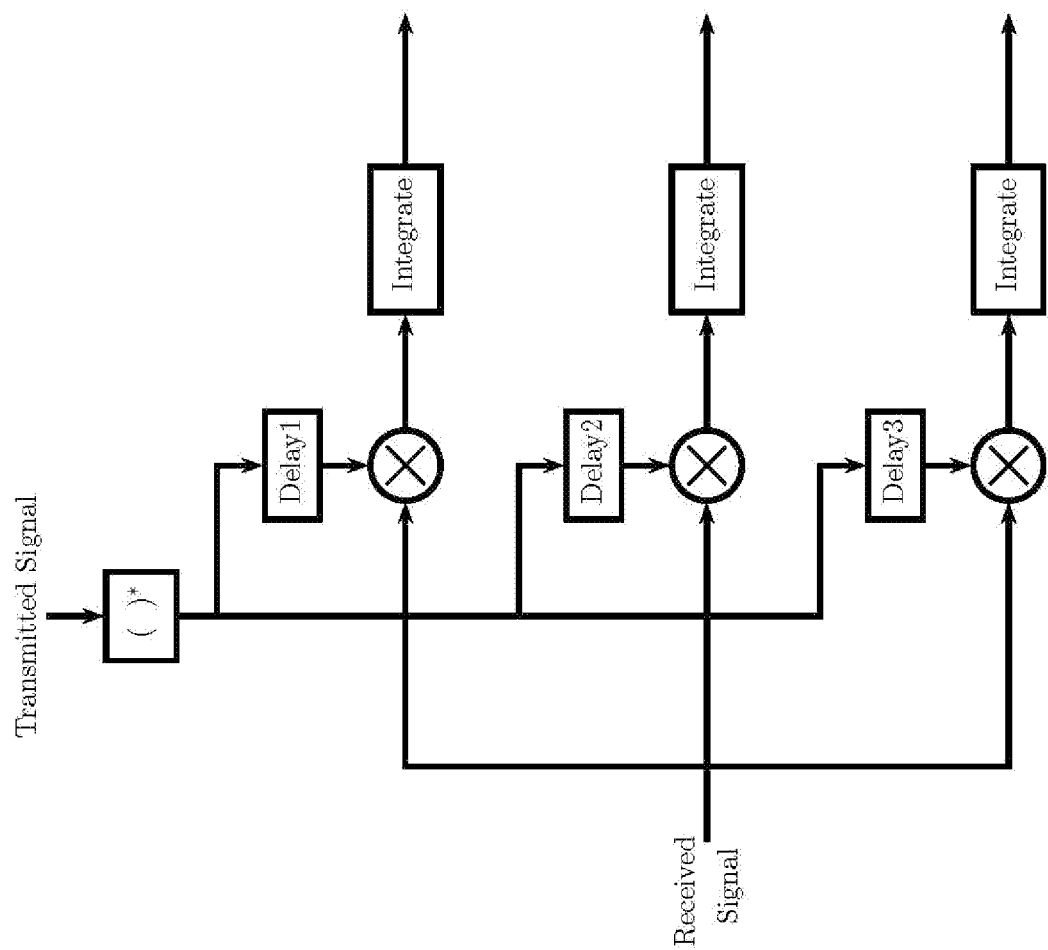
FIG. 6 is a block diagram illustrating the basic processing blocks of a plurality of correlators as used in a radar receiver in accordance with the present invention.

FIG. 5 illustrates a block diagram of an exemplary correlator 500. One input 510 to the correlator 500 is the received signal after down-conversion, amplification, filtering and analog-to-digital conversion. The second input to the correlator 500 is the delayed version (block 530) of the baseband transmitted signal (block 520) or the spreading code after complex conjugation (block 520). The correlator 500 multiplies (in block 540) these two inputs (received signal samples and transmitted signal samples) and integrates or sums (in block 550) the result over a certain time interval or a number of chips to produce an output (block 560). When an exemplary correlator has an input that is the delayed and conjugated transmitted signal, where the delayed value is the same as a delay of the transmitted signal reflected from the object, the correlator will produce a large magnitude output. Correlators, each with a different delay value, will be able to detect objects at different distances that correspond to their particular delays. As illustrated in FIG. 6, a receiver used to detect multiple delays can have multiple correlators, each with a different delay for the transmitted signal. FIG. 6 illustrates an exemplary three different delays (Delay1, Delay2, Delay3) applied to the transmitted signal and individually correlated (i.e., multiplied and integrated) with the received signal sample. To detect objects at different distances (corresponding to different delays) a correlator is needed at each possible delay for which it is desired to detect an object. For example, if the spreading code has $L_c$=1024 chips per period, then there can be 1024 correlators, one for each of the 1024 different possible delays, starting at 0. Correlation values for delays that are not an integer multiple of a chip duration can be interpolated from correlation values at each integer multiple of a chip duration.

A particular correlator will produce a sequence of correlator outputs that are large when the received signal has a delay that matches the delay of a replica of the baseband transmitted signal for that particular correlator. If the velocity of the radar system is different from the velocity of the object causing the reflection, there will be a Doppler shift in the frequency of the reflected signal relative to the transmitted signal. A sequence of correlator outputs for one particular delay corresponding to an object moving in the environment will have complex values that rotate at a rate related to the Doppler shift. Using a sequence of correlator outputs (also referred to as a scan), the Doppler shift may be estimated and thus the velocity of the object in the environment determined. The longer the sequence of correlator outputs used to estimate the Doppler frequency, the greater the accuracy and resolution of the estimation of the Doppler frequency, and thus the greater the accuracy in estimating the velocity of the object.

The correlation values for various time delays and various transmitter-receiver pairs, sometimes called virtual radars, are arranged in two-dimensional arrays known as time slices. A time slice is a two-dimensional array with one dimension corresponding to delay or range bin and the other dimension corresponding to the virtual radar (transmitter-receiver pair). The samples are placed into respective range bins of the two-dimensional array (as used herein, a range bin refers to a distance range corresponding to a particular time delay corresponding to the round trip time of the radar signal from a transmitter, to the target/object, and back to the receiver). The virtual receivers of the radar system define one axis of the two-dimensional time slice and the range bins define the second axis of the two-dimensional time slice. A new time slice comprising complex correlation values is generated every 2-30 microseconds. Over a longer time interval, herein referred to as a "scan" (typically, in a duration of 1-60 milliseconds or longer), multiple time slices are accumulated to form a three-dimensional radar data cube. One axis or dimension of the three-dimensional radar data cube is defined by time (of each respective time slice requiring 2-30 microseconds), while the receivers (or virtual radars) define a second axis of the three-dimensional radar data cube, and the range bins and their corresponding time delays define a third axis of the three-dimensional radar data cube. A radar data cube may have a preselected or dynamically defined quantity of time slices. For example, a radar data cube may include 100 time slices or 1000 time slices of data. Similarly, a radar data cube may include different numbers of range bins. The optimized use of radar data cubes is described in detail in U.S. Pat. No. 9,599,702, which is hereby incorporated by reference herein in its entirety.

A single correlator output corresponding to a particular range bin (or delay) is a complex value that corresponds to the sum of products between a time-delayed replica of the baseband transmitted signal—with a time-delayed replica corresponding to each range bin—and the received down-converted complex samples. When a particular time-delayed replica in a particular range bin correlates highly with the received signal, it is an indication of the time delay (i.e., range of the target/object) for the transmitted signal that is received after the transmitted signal reflects from the target/object. Multiple correlators produce multiple complex correlation values corresponding to different range bins or delays. As discussed herein, each time slice contains one correlation value in a time series of correlation values upon which Doppler processing is performed (e.g., Fourier transforms, such as a fast Fourier transform (FFT)). In other words, a time series of complex correlation values for a given range bin is used to determine the Doppler frequency and thus the velocity of a target/object in the range bin. The larger the number of correlation values in the time series, the higher the Doppler resolution. A matched filter may also be used to produce a set of outputs that correspond to the correlator outputs for different delays.

There may be scans for different correlators that use replicas of the transmitted signal with different delays. Because there are multiple transmitters and multiple receivers, there may be correlators that process a received signal at each receiver that are matched to a particular transmitted signal by a particular transmitter. Each transmitter-receiver pair is called a "virtual radar" (a radar system preferably has 4 virtual radars, or more preferably 32 virtual radars, and most preferably 256 or more virtual radars). The receive pipeline of the radar system will thus generate a sequence of correlator outputs (time slices) for each possible delay and for each transmitter-receiver pair. This set of data, as noted herein, is called a radar data cube (RDC). Storing the radar data cube can involve a large amount of memory, as its size depends on the desired number of virtual radars (for example, 4-64 or more virtual radars), the desired number of range bins (for example, 100-500 or more range bins), and the desired number of time slices (for example, 200-3000 or more time slices). Methods for storing radar data cubes are described in detail in the above mentioned U.S. Pat. No. 9,599,702.

The complex-valued correlation values contained in a three-dimensional radar data cube may be processed, preferably by a processor established as a CMOS processor and coprocessor on a common/same semiconductor substrate, which is typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common/same semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796,094; 6,396,397; 6,690,268 and 5,550, 677, which are hereby incorporated herein by reference in their entireties) within the common/same semiconductor substrate as well.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution requires a longer scan. A high Doppler resolution is very valuable because no matter how close two objects or targets are to each other, as long as they have slightly differing radial velocity (their velocity towards or away from the radar system), they can be distinguished by a radar system with a sufficiently high enough Doppler resolution. Consider a walking adult next to a walking child, where the adult is moving towards the radar system at 1.5 meters per second while the child is moving towards the radar system at 1.2 meters per second (ignoring how fast the radar system may be moving). If the Doppler resolution of the radar system is high enough, the radar system will be able to distinguish the two targets. However, if the radar system is only able to achieve Doppler resolutions of up to an exemplary 0.5 meters per second, the radar system will be unable to distinguish the two targets. Preferably, the Doppler resolution is 1 meter per second (m/s), more preferably 0.1 m/s, and most preferably less than 0.05 m/s.

Figure 7:
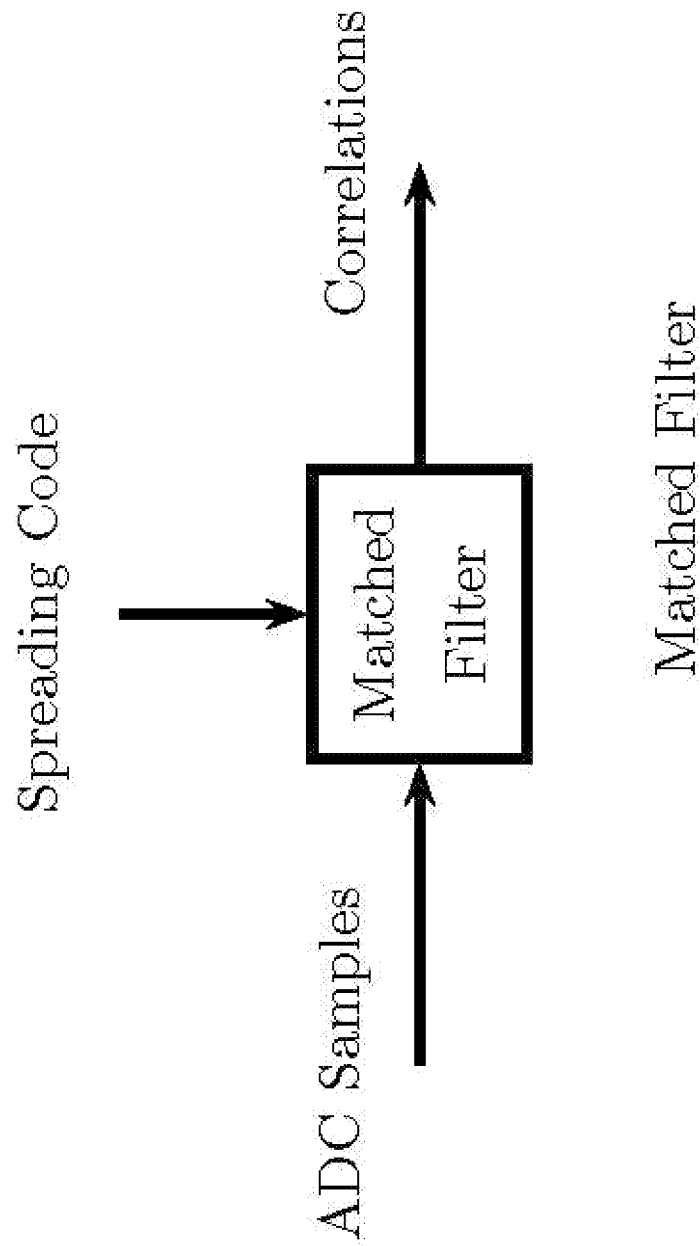
FIG. 7 illustrates a matched filter used in a radar receiver in accordance with the present invention.

An alternate way of performing multiple correlators is with a matched filter. A matched filter produces an output signal such that the output at different times corresponds to the correlation with different delays of the transmitted signal. FIG. 7 illustrates an implementation with a matched filter. Here the impulse response of the filter is matched to the transmitted signal. If the function s(t) is the transmitted signal with a time duration T, then the impulse response of the matched filter is $h(t)=s^*(T-t)$. That is, the matched filter has as impulse response that is the time flip and conjugate of the transmitted signal. The output of the matched filter, as a function of time, corresponds to correlations with all possible delays. However, the matched filter is generally more complex to implement than a set of correlators because the matched filter is producing the correlation of the received signal with all possible delays in some range, whereas a set of correlators produces just the correlations desired. Therefore, the object of this invention is to reduce the complexity needed to compute the correlation values over a desired set of delays.

Efficient High Throughput FFT-Based Correlation for PMCW Radar:

As discussed herein, exemplary PMCW based radar systems require a high throughput correlator. In an aspect of the present invention, an efficient high-throughput correlator based on a fast Fourier transform (FFT) is provided. As discussed herein, samples of the received signal are converted into the frequency domain before correlation is performed. Conversion from a time domain sequence to a frequency domain sequence or signal using a fast Fourier transform is described below. It is understood by one of ordinary skill in the art that there are different ways to transform a time domain sequence to a frequency domain sequence.

The radar sensing system of the present invention may utilize aspects of the radar systems described in U.S. Pat. Nos. 9,753,121; 9,599,702; 9,575,160 and 9,689,967, and U.S. patent application Ser. No. 15/416,219, filed Jan. 26, 2017, now U.S. Pat. No. 9,772,397, Ser. No. 15/492,159, filed Apr. 20, 2017, Ser. No. 15/491,193, filed Apr. 19, 2017, now U.S. Pat. No. 9,806,914, Ser. No. 15/492,160, filed Apr. 20, 2017, now U.S. Pat. No. 9,791,564, Ser. No. 15/496,038, filed Apr. 25, 2017, Ser. No. 15/496,313, filed Apr. 25, 2017, now U.S. Pat. No. 9,846,228, Ser. No. 15/496,314, filed Apr. 25, 2017, now U.S. Pat. No. 9,791,551, Ser. No. 15/496,039, filed Apr. 25, 2017, and Ser. No. 15/598,664, filed May 18, 2017, and U.S. provisional application Ser. No. 62/395,582, filed Sep. 16, 2016, and Ser. No. 62/528,789, filed Jul. 5, 2017, which are all hereby incorporated by reference herein in their entireties.

An exemplary radar system includes $N_T$ transmitters and $N_R$ receivers for $N_T \times N_R$ virtual radars, one for each transmitter-receiver pair. For example, a radar system with eight transmitters and eight receivers will have 64 pairs or 64 virtual radars (with 64 virtual receivers). When three transmitters (e.g., Tx1, Tx2, Tx3) generate signals that are being received by three receivers (e.g., Rx1, Rx2, Rx3), each of the receivers is receiving the signal sent from each of the transmitters reflected by objects in the environment. Each of the receivers is receiving the sum of reflected signals due to all three of the transmissions at the same time. Each receiver can attempt to determine the range and Doppler of objects by correlating with delayed replicas of the signal from one of the transmitters. The physical receivers may then be "divided" into three separate virtual receivers, each virtual receiver correlating with a replica of one of the transmitted signals. In a preferred radar system of the present invention, there are 1-4 transmitters and 4-8 receivers, or more preferably 4-8 transmitters and 8-16 receivers, and most preferably 16 or more transmitters and 16-64 or more receivers.

As mentioned earlier, there are various types of signals used in radar systems. An exemplary radar system utilizing a continuous signal may, for example, frequency modulate the continuous signal or phase modulate the continuous signal. In a phase modulated continuous wave (PMCW) signal, the variation of the phase may be according to a spreading code. A spreading code may be binary (e.g., +1 and −1) in which case the phase of the transmitted signal at any time takes on one of two possible values (e.g., 0 and $\pi$ radians). Spreading codes with more than two levels can also be used, as well as complex spreading codes. The code may repeat after a certain time duration, sometimes called the pulse repetition interval (PRI). Therefore, various types of spreading codes can be used. These include pseudorandom binary sequence (PRBS) codes (also called m-sequences), almost perfect autocorrelation sequences (APAS), Golay codes, constant amplitude zero autocorrelation codes (CAZAC) (also known as Frank-Zadoff-Chu (FZC) sequences), generalized chirp-like (GCL) sequences, as well as many other codes not specifically mentioned. In a radar system with a single antenna, a single spreading code is used. The autocorrelation of this single code determines the capability of the radar to estimate range (range resolution and maximum unambiguous range). Codes with good autocorrelation properties include m-sequences, FZC sequences, and Golay codes. These codes have small sidelobes (the off-center autocorrelation). Codes that have ideal autocorrelation (e.g., Golay codes and CAZAC codes) can have range sidelobes in the presence of a non-zero Doppler shift that will limit the detectability of far targets in the presence of near targets.

In a multiple-input, multiple-output (MIMO) system, there are multiple transmitters that operate simultaneously. Each transmitter can use a unique spreading code and thus multiple codes are needed, one for each transmitter. In this case, codes that have good autocorrelation and cross correlation properties are desirable. Generally, the better the autocorrelation of codes, the worse the cross correlation properties.

Figure 8:
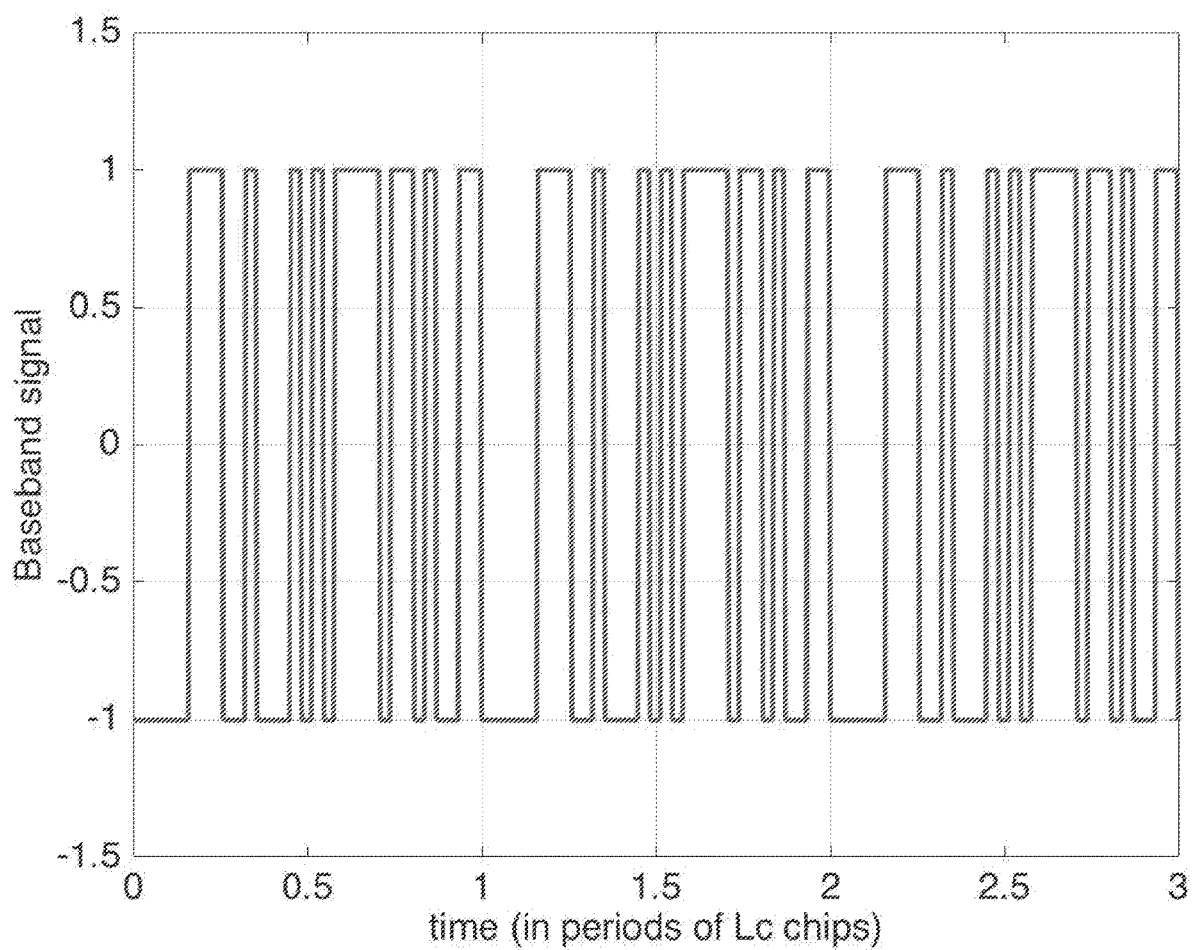
FIG. 8 is a diagram illustrating a transmitted signal using an m-sequence of length 31 in accordance with the present invention.

FIG. 8 illustrates an exemplary baseband signal using a spreading code with a period of $L_c=31$. The chips in this example are from a maximal length sequence (m-sequence) of length $L_c=31$ generated by a shift register of length 5. Note that the signal repeats every $L_c$ chips or $L_c T_c$ seconds. The pulse repetition rate is $R_{PR}=1/(L_c T_c)$. The transmitted signal is generated when the baseband signal is modulated onto a carrier frequency to generate a radio frequency signal.

The received signal (the transmitted signal reflected from objects in the environment) is down-converted to a complex baseband signal. Such down-conversion may be performed with an RF frontend analog signal processor, such as provided by the analog processing module 470 of FIG. 4. The analog signal processing includes amplification, mixing with a local oscillator signal, and filtering. The mixing is performed with two sinusoidal signals that are 90 degrees out of phase (e.g., cosine and sine). After down-conversion, the complex analog baseband signal is converted to a complex baseband digital signal. Such conversion may be performed with an analog-to-digital converter (ADC) 480, as illustrated in FIG. 4. The complex baseband digital signal is then the input to a digital processing unit 490. The digital processing unit 490 can perform the desired signal processing via correlations or matched filtering. An exemplary correlator multiplies the received complex baseband signal by a delayed replica of the baseband transmitted signal. The result is accumulated over a certain time interval. A bank of correlators, with each correlator having a different delay used for the replica of the baseband transmitted signal, will produce a set of correlations that correspond to different ranges. Therefore, a correlator with a particular delay of the baseband transmitted signal is looking for the presence of a radio signal reflected from an object at a distance corresponding to the time for which the round-trip delay is the particular delay used for the baseband transmitted signal.

A matched filter is a device that produces all correlations for all possible delays. That is, the output of the matched filter at a given time corresponds to a correlation with a given delay applied to the transmitted signal when doing the correlation. The matched filter provides all possible correlations. Note that the matched filter will produce a complex output because the input is complex.

Figure 9:
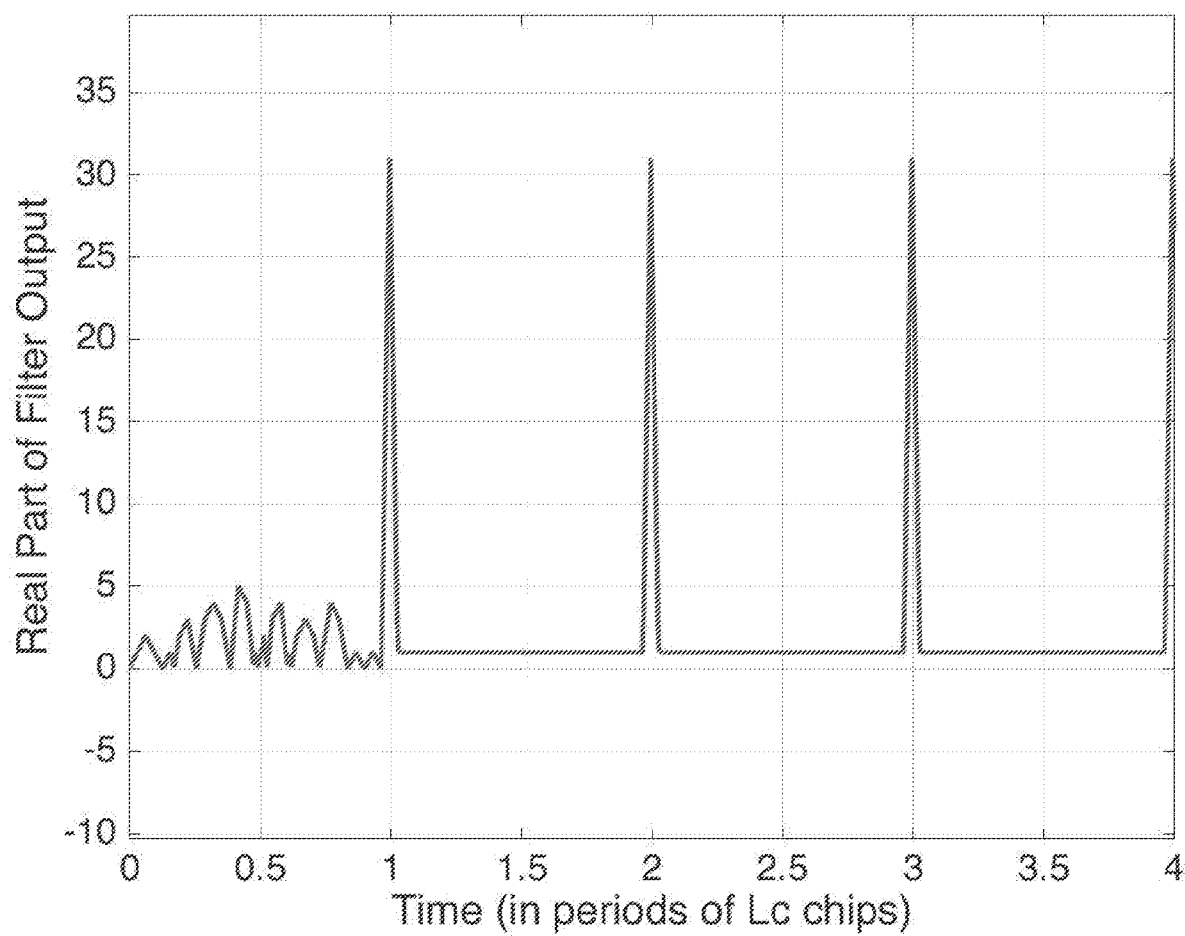
FIG. 9 is a diagram illustrating an output of a matched filter with a single target in accordance with the present invention.

FIG. 9 illustrates the real part of the output of a matched filter due to the transmitted baseband signal from FIG. 8. It is assumed that the radar started to transmit at time 0 and there is no delay between the transmitter and receiver. That is, there is an object at distance 0. The matched filter will output partial correlations until a full period of the signal has been transmitted. That is, the matched filter correlates with only a portion of the code because only a portion of the code has been transmitted. Only after the entire period of the code has been transmitted does the correlation reach a peak. In continuous operation, an object that has a delay of one period of the spreading code will appear to have the same delay as an object at distance 0. Thus, a radar using this system cannot determine whether the delay is 0, one period of the spreading code, or two periods of the spreading code, and so on. Therefore, the maximum unambiguous range in this case corresponds to at most one period of the spreading code. A longer spreading code will yield a larger maximum unambiguous range. A delay of $\tau$ corresponds to a range, determined by $R=(\tau^*c)/2$, where c is the speed of light. There is a factor of two in the above equation because the delay corresponds to the round-trip time from the radar to the target and back to the radar. Here the assumption is that the transmitter and receiver are approximately co-located.

Figure 10:
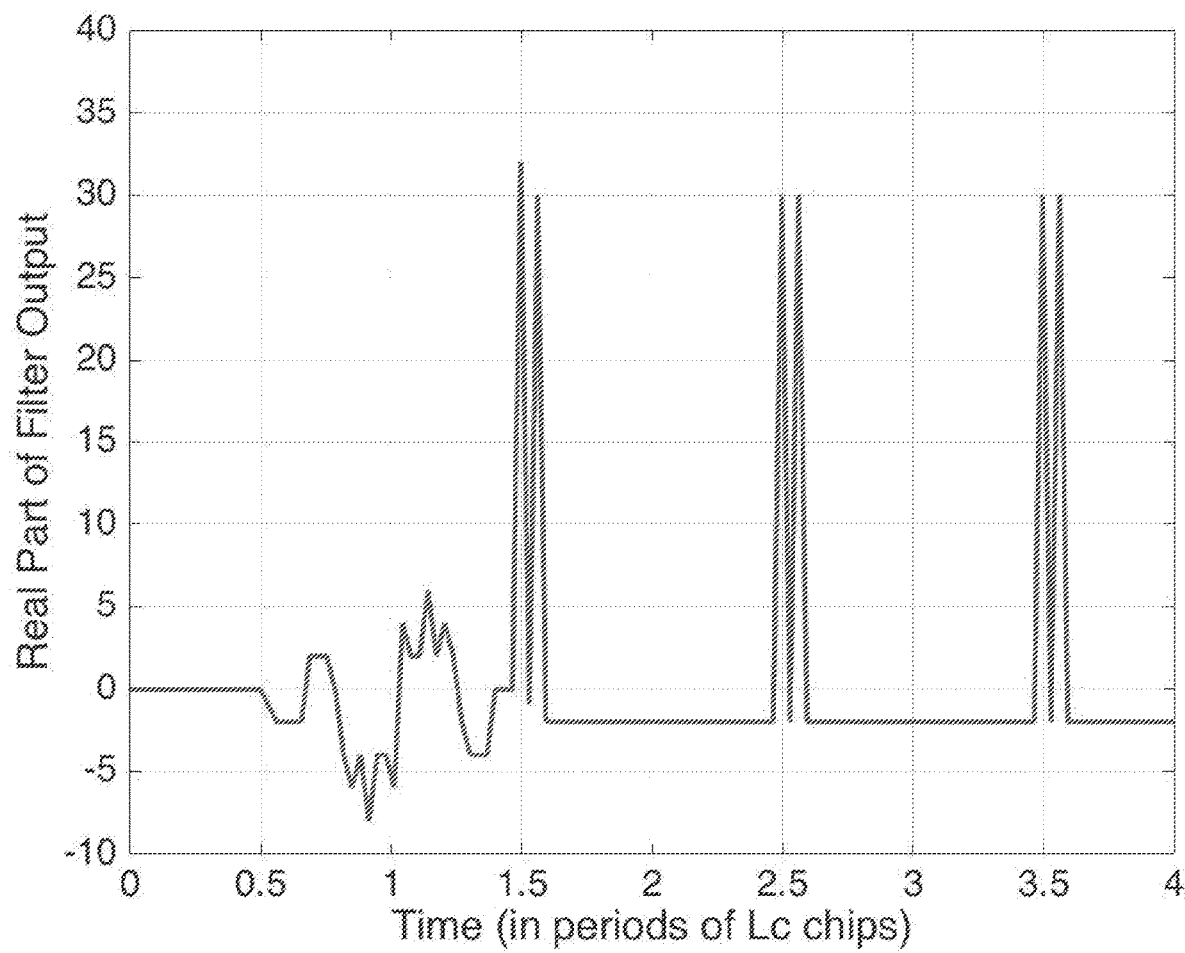
FIG. 10 is a diagram illustrating an output of a matched filter with two targets separated by more than a chip in equivalent delay in accordance with the present invention.

FIG. 10 is a diagram illustrating the real part of the output of the matched filter when there are two objects that have a differential range delay of 2 chip durations. The filter output shows two distinct peaks in the output of the matched filter.

In an aspect of the present invention, exemplary spreading codes have a period or length $L_c$. In this case, a maximum unambiguous range is $d_U=c/(2L_cT_c)$, where $T_c$ is the chip duration. That is, objects at distances of $d_U+d$ can be confused with objects at a distance d. The goal is to perform correlations of the signal that correspond to delays of less than a maximum unambiguous range or an even smaller set of ranges with minimal complexity.

In an aspect of the present invention, exemplary correlator outputs are denoted by w(m), where m=0, 1, . . . , $L_c$–1. The relation between the ADC sample, x(m), the spreading code a(l), l=0, 1, . . . , $L_c$–1, and the desired correlation is:

$$w(m) = \sum_{l=0}^{L_c-1} x(l+m)a^*(l), m = 0, 1, \ldots, L_c - 1.$$

Here, the output of the correlation for m=0 is the zero-delay correlation corresponding to an object at distance 0. The correlator output for m=1 corresponds to an object at distance $c/(2T_c)$. The correlator output for m=2 corresponds to an object at distance $(d/(4T_c))$. The correlator output for m=$L_c$–1 corresponds to a delay of $c/(2(L_c-1)T_c)$. In order to calculate these correlations, the input samples from 0 to $2L_c$–1 are needed. This process is repeated for samples from $L_c$ to $3L_c$–1 in order to get an updated correlation for different delays.

The spreading codes can be complex or real. The samples output from the receiver ADC are complex. In order to perform a single correlation with a particular delay $L_c$, complex multiplications need to be performed along with $L_c$–1 complex additions. The number of multiplications and additions are quantified as complex multiply and accumulation operations (cMAC). A single correlation of $L_c$ complex samples with complex multiplication and additions requires $L_c$ cMAC operations.

A correlation for each of B delays thus requires $L_c \times B$ cMAC operations. If these correlations are done for $N_R \times N_T$ virtual radars then the total number of cMAC operations becomes $N_R \times N_T \times L_c \times B$ cMAC operations. If $L_c$=1024, $N_R$=4, $N_T$=8, B=1024 then approximately 33 million cMAC operations are required. Therefore, there are about 1 million operations required for each virtual receiver (transmitter-receiver pair).

As a first embodiment of this invention, a reduced complexity method of correlation for radar signal processing is provided where the correlations are performed for a reduced set of possible delays. In order to calculate the correlations, the relevant signals are converted to the frequency domain. The frequency domain signals are subsequently multiplied component-by-component and then converted back to the time domain.

Figure 11:
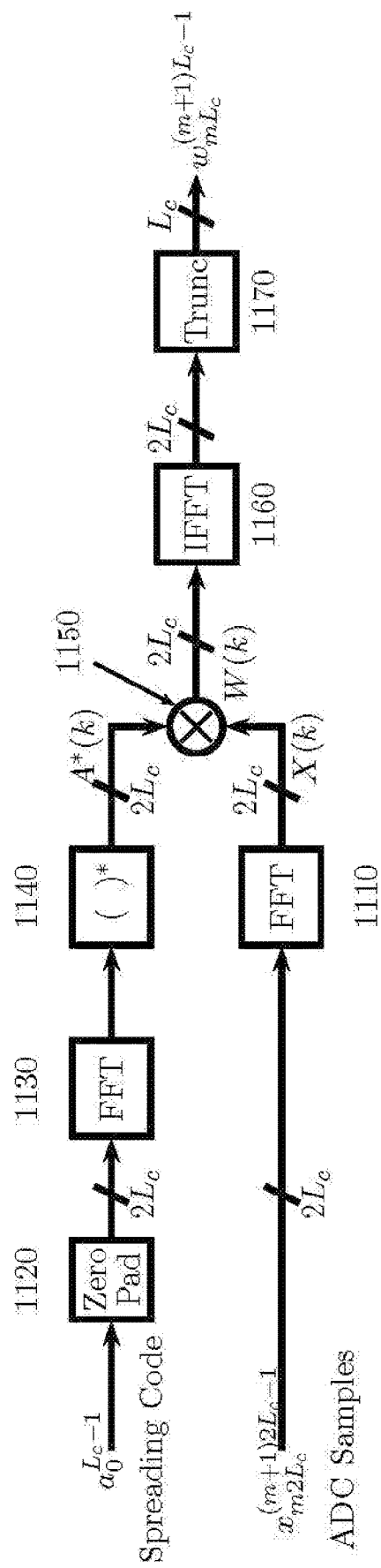
FIG. 11 is a block diagram of an exemplary FFT-based correlator of a receiver in which received signals are converted to frequency domain signals, multiplied component-by-component and then converted back into the time domain in accordance with the present invention.

Exemplary processing is illustrated in FIG. 11. In FIG. 11, $x_l^m$ denotes the samples x(l), x(l+1), . . . , x(m). The complex received ADC-output samples are denoted x(m), where m=0, 1, 2, . . . . The spreading code is denoted a(m), where m=0, 1, 2, . . . , $L_c$–1. A set of $2L_c$ complex received samples are the input to a fast Fourier transform (FFT) operation (block 1110) to generate a set of $2L_c$ frequency domain samples, which are denoted by X(k), where k=0, 1, . . . , 2L–1. The spreading code is concatenated with $L_c$ zeros (in block 1120). The zero-padded spreading code output from block 1120 is transformed to the frequency domain by an FFT operation (block 1130). The output of the FFT for the spreading code is denoted as A(k), where k=0, 1, . . . , 2L–1. These frequency domain samples (for the spreading code) are conjugated in block 1140. The next operation is to multiply (in block 1150) X(k) with the complex conjugate of A(k). That is W(k)=X(k)A*(k), where k=0, 1, ..., 2L−1, and where A*(k) denotes the complex conjugate of A(k). The next operation, in block 1160, takes an inverse FFT of the signal W(k) to obtain the signal w(m), where m=0, 1, ... 2$L_c$−1. Only the first $L_c$ of these output values are needed and they correspond to the $L_c$ different correlations. A truncation operation in block 1170 is performed after the IFFT.

This process is repeated using ADC samples from $L_c$ to 3$L_c$−1 to update the correlations with the transmitted signal to update the estimates of the location of objects within the unambiguous range. Note that the steps in blocks 1120, 1130, and 1140 do not need to be repeated if the spreading codes are periodic.

The number of computations (i.e., multiplication operations) for an FFT or an IFFT operation of size N is generally N log$_2$(N). Here, N=2$L_c$. In addition to the two FFT operations and the IFFT operation, there are 2$L_c$ complex multiplications. The number of calculations is then 6$L_c$ log$_2$ (2$L_c$)+2$L_c$. For example, if $L_c$=1024 then using the FFT operations requires only about 70,000 complex operations. This is much smaller than the 1 million complex operations that would be required for direct implementation.

For large values of $L_c$ (e.g., $L_c$=1024 or larger), the number of computations required to determine all possible correlations is large. If there is interest in only the delays in the range of 256 chips, then the number of correlations needed is significantly reduced. The present invention can still employ the FFT type of processing as follows.

In an aspect of the present invention, from all the possible correlations (i.e., $L_c$ correlations), only a particular portion (i.e., B correlations) of those correlations are required to determine objects in a certain range. The correlation is still of length $L_c$, but only the correlations corresponding to delays from, say, 0 to B−1 are required. The process starts by partitioning the receiver ADC samples x(0), ..., x($L_c$+B−1), into blocks of size B samples. Similarly, the code values a(0), a(1), ..., a($L_c$−1) are also partitioned into blocks of size B. Assuming that $L_c$ is a multiple of B and there are $N_B$ blocks, then $x_b$(n)=x(bB+n), where n=0, 1, ..., B−1, and b=0, 1, ... $N_B$−1. Similarly, $a_b$(n)=a(bB+n), where n=0, 1, ..., B−1. The calculation of correlations using $x_0$ and $x_1$ with a zero-padded version of $a_0$ is performed to yield all of the correlations of the first two blocks of x, namely $x_0$, $x_1$, with the first block of a, namely $a_0$. That is, delays of x between 0 and B−1 are correlated with the portion of the spreading code $a_0$. However, only the first B of these outputs are retained. The last B samples are deleted. The result is $w_0$=w(0), w(1), ... w(B−1). Next, two blocks of x, namely $x_1$ and $x_2$ are correlated with $a_1$ in a similar manner to yield $w_1$. Similarly for each successive block of x. The result is a sequence of partial correlations $w_0$, $w_1$, ..., $w_{N_B-1}$. Each correlation is calculated by performing 2 B point FFT operations, taking a product, performing IFFT operations, and then truncating. Then the sum of the block correlations w=$w_0$+$w_1$+ ... +$w_{N_B-1}$ is determined. This yields the total correlation with delays between 0 and B−1 of the received signal with the transmitted signal.

As an example, an exemplary spreading code comprises $L_c$=1024 chips. However, only correlations with delays less than an exemplary 256 chips are to be computed. The received signal is therefore organized into blocks of size B=256 chips. Five of these blocks are needed in order to calculate the correlations with delays up to 255 chips. The code is also organized into blocks of size 256 chips. FIG. 12 illustrates the received samples (from the ADC) organized into the above described blocks, as well as the code values also similarly organized into blocks. To compute the correlation (over 1024 chips) with delay 0, the correlation between each block is calculated and then summed. That is, the correlations of $x_0$ with $a_0$, the correlations of $x_1$ with $a_1$, the correlations of $x_2$ with $a_2$, and the correlations of $x_3$ with $a_3$. Because the present invention is correlating a delayed value of x with a, to correlate delayed versions of an exemplary $x_0$ with $a_0$, the values from $x_1$ are also needed. Therefore, a block of 2B samples of the received signal are needed. To compute the correlation with a delay of, for example, 1 chip, a correlation of the last 255 samples of a first block concatenated with the 1st sample of a second block of received samples is computed. Similarly, for the correlation with the last 255 samples of the second block and the 1st sample of a third block with the spreading code. Thus, in doing these block correlations, the same type of processing as was done previously for the full sequence is done for each block. After the IFFT operation the results are accumulated.

Figure 13:
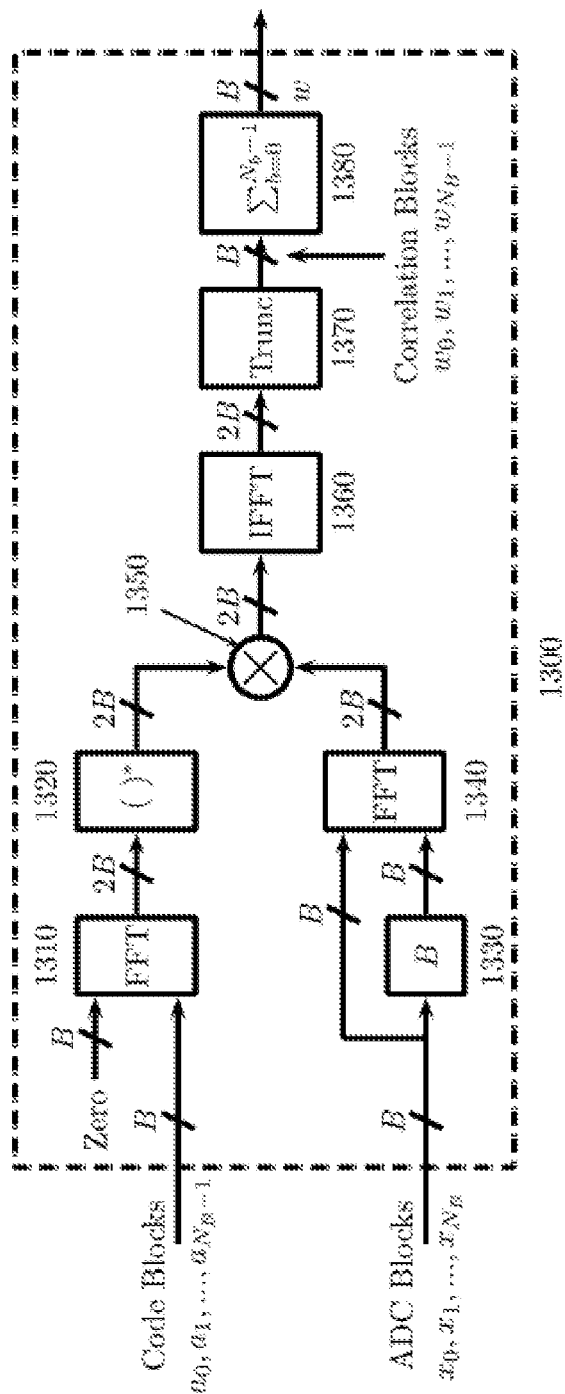
FIG. 13 is a block diagram of another exemplary FFT-based correlator in accordance with the present invention.

FIG. 13 is a block diagram illustrating the modules for a block FFT-type correlation operation 1300. A block of the spreading code of size B is padded with B zeros and then a 2B—point FFT is taken (in block 1310) for which the result is conjugated (in block 1320). Meanwhile, a set of B samples of the received ADC output are buffered (in block 1330). Two consecutive blocks of the received samples are transformed using a 2B—point FFT (in block 1340). An element-by-element product of the two frequency domain sequences is taken (in block 1350) after conjugating one of the code blocks. The resulting output from block 1350 is input to a 2B—point inverse FFT (in block 1360). The output of the IFFT in block 1360 is truncated (in block 1370) and then summed over $N_B$ consecutive blocks (in block 1380). The result is a correlation of the received signal with delays between 0 and B−1 chips.

To compare the complexity of implementation, first consider an exemplary receiver that performs a direct correlation of the received samples but only for the desired range bins. If there are B desired range bins and each requires $L_c$ operations (i.e., multiply and accumulate) then the total number of calculations would be B $L_c$. For B=256 and $L_c$=1024 this corresponds to 262,144 operations. The complexity of implementation in the frequency domain is determined as follows. Each FFT or IFFT requires about (2B) log$_2$(2B) cMAC operations. There are a total of 3$N_B$ such FFT/IFFT operations necessary, although the FFT of the code could be stored rather than computed. There are $N_B$B complex multiplications and there are ($N_B$−1)B sums to compute. The total is 3$N_B$(2B)log$_2$(2B)+(2$N_B$−1)B. As an example, suppose $L_c$=1024, $N_B$=4, and B=256. Then, the number of calculations for $N_B$=4 blocks, each of size 256, is 57,088, while for one block, $N_B$=1, the number of computations is about 70,000. This is significantly lower than the number of computations required for the direct correlator implementation which calculates all 1024 correlations. While a larger FFT size generally reduces complexity, because only B of the $L_c$ possible correlations are determined, a smaller value of B (i.e., smaller than $L_c$) actually reduces the number of operations needed. For smaller values of B, fewer computations are required but fewer correlations at different delays are also computed.

Now consider multiple transmitters and multiple receivers. For a direct implementation, $L_c$×B×$N_T$×$N_R$ calculations are necessary to compute the correlations. For $L_c$=1024, B=256, $N_T$=4, and $N_R$=8, this becomes 8,388,608 operations. With an FFT-based implementation when there are multiple transmitters and multiple receivers only one FFT of each of the received sample blocks needs to be performed (for each block) and only one FFT of each of the code blocks needs to be computed. If there are $N_T$ transmitters and $N_R$ receivers, then the number of FFTs for each receiver is $N_T \times N_B$ for the code, $N_R \times (N_B+1)$ for the received signal, and then $N_T \times N_R \times N_B$ for the inverse FFT, for a total of $(N_T + N_R + N_T \times N_R) \times N_B$ FFT-like operations. Each FFT (or IFFT) requires (2B) $\log_2$(2B) operations. There are also $N_T \times N_R \times N_B \times 2B$ multiplications and $N_T \times N_R \times N_B \times B$ additions. So the total number of operations is $(N_T + N_R + N_T \times N_R) \times N_B \times (2B) \log_2(2B) + 3B \times N_B \times N_T \times N_R$, where the first term is for the FFT with each operation being a complex multiply and add, and where the last term is for the "adds" and "multiplies." For the example of $L_c$=1024, $N_B$=4, B=256, $N_T$=4, and $N_R$=8, the number of operations required with the FFT-type implementation is 909,312. This is about a 9 times reduction from the direct implementation. If the number of correlations is reduced to B=64, the number of calculations is reduced to 413,696 or about 20 times smaller than direct implementation.

Figure 14:
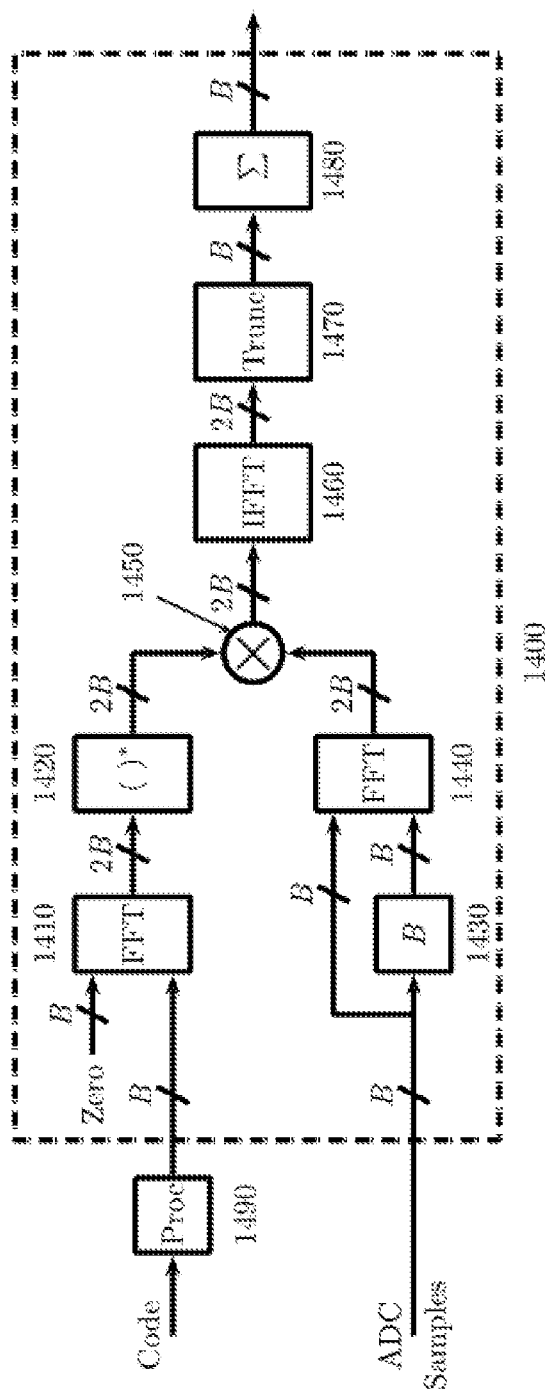
FIG. 14 is a block diagram of another exemplary FFT-based correlator in accordance with the present invention.

There are many variations that can be applied to the structure of the FFT-block based implementation. The FFT-based correlator 1400 illustrated in FIG. 14 is similar to the FFT-based correlator 1300 illustrated in FIG. 13, except for the addition of a processor block 1490. As illustrated in FIG. 14, processing (in block 1490) of the FFT-based correlator 1400 is done on the code sequence before the Fourier transform operation, although the processing could also be after the Fourier transform. One purpose of processing the code sequence is to shift the frequency of the code so that the Doppler shift of the received sequence is applied to the code sequence before the correlation operation. There could be other reasons to process the code sequence before or after the Fourier transform operation. The filtering of certain frequency bands more than other frequency bands is one purpose that can be achieved by this processing.

The structure used to generate the correlations in this block processing, as illustrated in FIG. 13, generates correlations with a contiguous set of ranges. For example, for B=64 and $L_c$=1024 there can be multiple contiguous bins. For example, correlations corresponding to delays of 0 to 63 chip durations and correlations corresponding to delays of 128 to 195 can be obtained by combining two versions of what is illustrated in FIG. 13. It is possible that some savings of FFT processing can be obtained when doing multiple sets of ranges.

Figure 15:
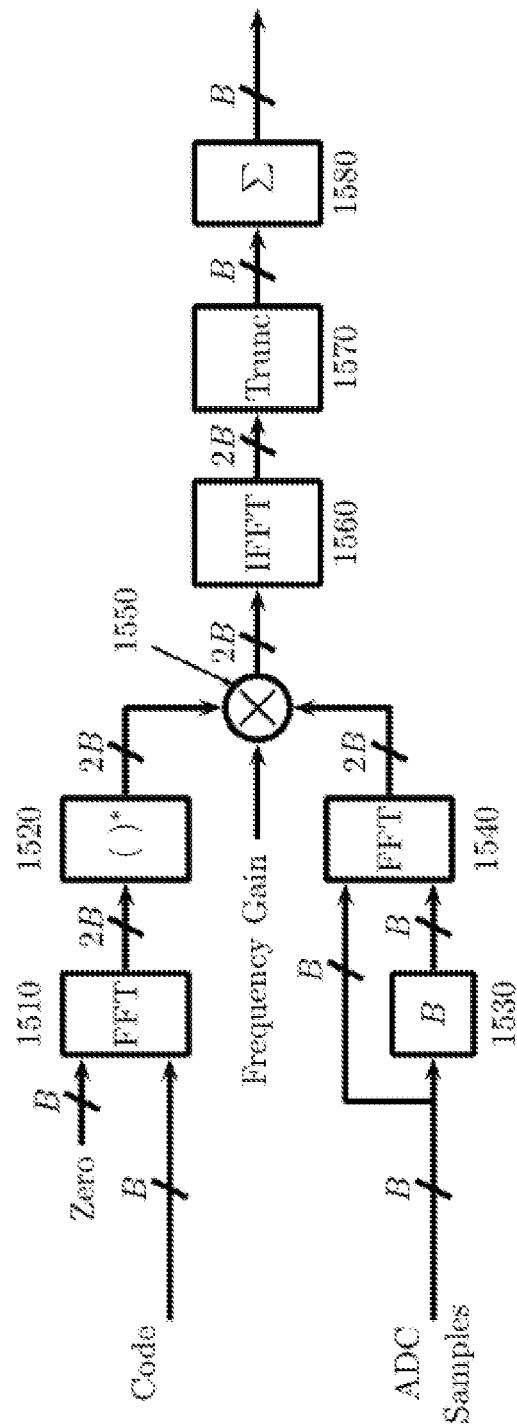
FIG. 15 is a block diagram of another exemplary FFT-based correlator in accordance with the present invention.

Another variation can be applied to the structure of the FFT-block based implementation. One such variation is illustrated in FIG. 15. While the FFT-based implementation illustrated in FIG. 15 is similar to those illustrated in FIGS. 13 and 14, FIG. 15 includes an additional input (labeled as a "frequency gain") to the multiply/product operation (block 1550). This additional input can be used for a variety of purposes. One purpose would be to notch out a particular frequency term. If there is an interferer at one particular frequency, then setting one or more of the frequency values to 0 (or at least a relatively small value) would mitigate the effect of the interferer. This also can be used to whiten the interference (i.e., transforming the interference into white noise).

Figure 16:
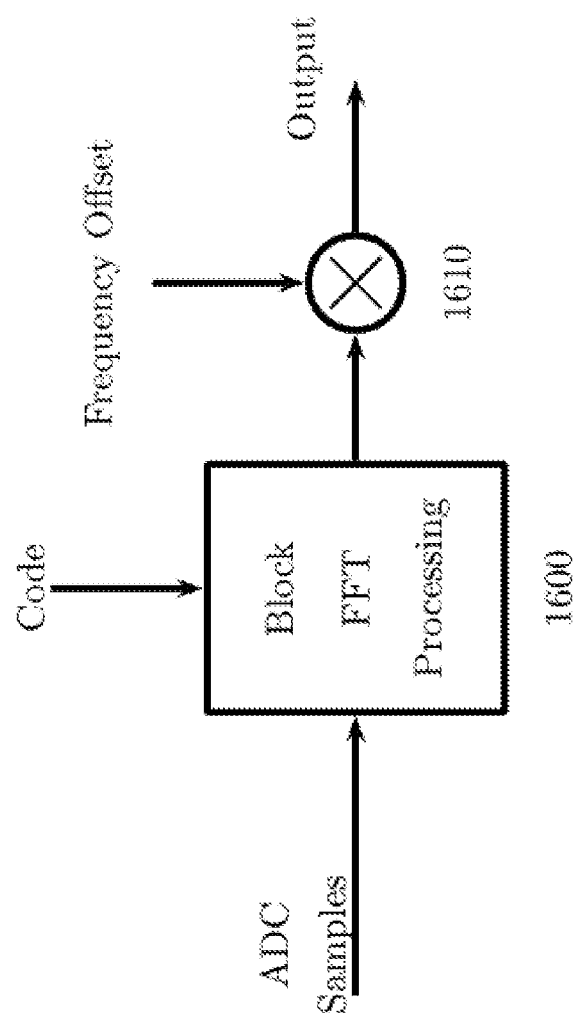
FIG. 16 is a block diagram of another exemplary FFT-based correlator in accordance with the present invention.

FIG. 16 is a block diagram illustrating another variation where a Doppler frequency compensation (frequency offset) is applied (in block 1610) to the output of the block FFT correlator 1600. By multiplying the output (of the block FFT correlator 1600) by a complex exponential, the frequency of the correlation values can be shifted. The complex exponential is $\exp\{j2\pi f_D nT\}$, where n=0, 1, . . . and where T is the correlation time and $f_D$ is the desired frequency shift (e.g., the Doppler frequency). This shifts the frequency of the signal and can compensate for a known Doppler in order that the resulting signal is centered near 0 Hz in frequency. Note that the output of the block FFT processor is a set of correlations corresponding to different ranges or delays. At each range of a potential object there may be a previously known velocity or Doppler shift for that object. A different frequency correction can be applied to each range bin.

The objects of this invention can also be applied to a pulse mode type of transmission whereby the transmitter transmits a signal of a certain time duration and then is silent for a certain time duration. For example, if the transmitted signal consists of 128 chips and then is silent for the same duration, simple modifications of the processing described above for continuous transmission operation can be applied to discontinuous transmission. In this case, the ADC samples that are input to the FFT (block 1340 in FIG. 13) can be padded by B zero samples instead of the past B zeros samples. In this case the code sequence and the received samples are zero padded.

Another variation is to pad the received signal and then buffer the code in the block FFT correlator. It is also possible to preprocess the code in the block FFT to account for channel effects. For example, knowing the vehicle velocity, the code can be Doppler shifted by an appropriate amount so that it matches the frequency of a received signal reflected from a stationary object.

Another variation is to offset the code or the signal (e.g., buffer a certain number of samples) to select a set of B contiguous range bins for which correlations are desired instead of the correlations from 0 to B−1. In another variation, a same set of signal samples and offset code are reprocessed through the same hardware in multiple passes for multiple blocks of outputs.

Another variation is to use the receiver processing to estimate the channel characteristics. In this variation one or more of the transmitters is silent (not transmitting). The receiver still processes the received signal with a block-FFT correlator and the block-FFT correlator is used to estimate the interference level.

Another variation is to perform at least two block FFT correlations in parallel. This parallel operation allows for the computation of, for example, two distinct sets of range bins for which correlation is performed.

While the operations of the radar receiver have been illustrated for the case of a PMCW type of radar, it is also applicable to FMCW type radars and to pulsed radar systems.

Various operations, including changing the gain, or changing a number of bits of representation for quantities, and other simple operations known to one skilled in the art can take place between various functions without departing from the spirit of the invention.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:
1. A radar sensing system for a vehicle, the radar sensing system comprising:
   a transmit pipeline configured for installation and use on a vehicle, wherein the transmit pipeline comprises at least one transmitter configured to transmit phase modulated continuous wave radio signals, and wherein the phase modulation is defined by a spreading code;

a receive pipeline configured for installation and use on the vehicle, wherein the receive pipeline comprises at least one receiver configured to receive phase modulated radio signals that include the transmitted radio signals reflected from objects in the environment, wherein each of the at least one receiver is configured to down-convert the received radio signals;

wherein each of the at least one receiver comprises at least one analog-to-digital converter (ADC) configured to convert the down-converted received radio signals into digital received samples, and wherein the digital received samples are time domain received samples;

wherein the time domain received samples are converted into frequency domain received samples via a Fourier transform type of operation; and wherein each of the at least one receiver is configured to correlate the received samples to detect object distance by multiplying the frequency domain received samples of the received radio signals with frequency domain samples associated with the spreading code.

2. The radar sensing system of claim 1, wherein each receiver of the at least one receiver further comprises a digital processing unit, wherein the digital processing unit is configured to convert the time domain received samples to the frequency domain received samples via a Fourier transform type of operation.

3. The radar sensing system of claim 2, wherein the Fourier transform operation comprises a fast Fourier transform operation.

4. The radar sensing system of claim 1, wherein each of the at least one receiver is configured to convert processed samples from the frequency domain to the time domain via an inverse Fourier transform operation.

5. The radar sensing system of claim 1, wherein each of the at least one receiver is configured to store code samples in the frequency domain.

6. The radar sensing system of claim 1, wherein each of the at least one receiver is configured to multiply frequency domain samples associated with a transmitted spreading code with frequency domain samples associated with the received radio signals.

7. The radar sensing system of claim 6, wherein each of the at least one receiver is configured to zero pad the transmitted spreading code to double length before converting to the frequency domain.

8. The radar sensing system of claim 1, wherein each of the at least one receiver is configured to:
partition a spreading code into blocks;
zero-pad the partitioned spreading code;
convert the zero-padded partitioned spreading code to the frequency domain; and
combine the samples related to the frequency domain, zero-padded, partitioned spreading code with samples related to the frequency domain received samples.

9. The radar sensing system of claim 1, wherein each of the at least one receiver is configured to perform block processing of the received samples, wherein a size of a block is smaller than a length of the spreading code.

10. The radar sensing system of claim 1, wherein a code sample is processed before or after the Fourier transform but before being multiplied by the frequency domain samples of the received radio signals.

11. The radar sensing system of claim 1, wherein each of the at least one receiver is configured to process code samples from either before or after the Fourier transform before the code samples are multiplied by the frequency domain samples of the received radio signals.

12. The radar sensing system of claim 1, wherein each of the at least one transmitter comprises a digital processing unit, a digital-to-analog converter, an analog processing unit, and transmitting antennas.

13. The radar sensing system of claim 1, wherein each of the at least one receiver comprises receiving antennas, an analog processing unit, and a digital processing unit.

14. A method of correlating received samples in a radar system for a vehicle, the method comprising:
providing a radar system comprising (i) at least one transmitter configured for installation and use on a vehicle and configured to transmit phase modulated continuous wave radio signals, wherein the phase modulation is defined by a spreading code, and (ii) at least one receiver configured for installation and use on the vehicle and configured to receive phase modulated radio signals that include the transmitted radio signals reflected from objects in the environment, wherein each of the at least one receiver is configured to down-convert the received radio signals;
converting the down-converted received radio signals, received by each of the at least one receiver, into digital received samples with at least one analog-to-digital converter (ADC) of the at least one receiver, wherein the digital received samples are time domain received samples;
converting the time domain received samples of the received radio signals into frequency domain received samples via a Fourier transform type of operation; and
correlating the received samples to detect object distance by multiplying the received samples in the frequency domain with frequency domain samples associated with the spreading code in at least one receiver.

15. The method of claim 14, wherein the Fourier transform operation comprises a fast Fourier transform operation.

16. The method of claim 14 further comprising converting processed samples from the frequency domain to the time domain via an inverse Fourier transform type of operation.

17. The method of claim 14 further comprising storing code samples in the frequency domain, wherein each of the at least one receiver is configured to store the code samples.

18. The method of claim 14 further comprising multiplying frequency domain samples associated with a transmitted spreading code with frequency domain samples associated with the received radio signals.

19. The method of claim 18 further comprising zero padding the transmitted spreading code to double length before converting to the frequency domain.

20. The method of claim 14 further comprising:
partitioning a spreading code into blocks;
zero-padding the partitioned spreading code;
converting the zero-padded partitioned spreading code to the frequency domain; and
combining samples related to the frequency domain, zero-padded, partitioned spreading code with samples related to the frequency domain received samples.

21. The method of claim 14, wherein the correlating the frequency domain received samples comprises performing block processing of the received samples, and wherein a size of a block is smaller than a length of the spreading code.

22. The method of claim 14, wherein a code sample is processed before or after the Fourier transform but before being multiplied by the frequency domain samples of the received radio signals.

23. A radar sensing system for a vehicle, the radar sensing system comprising:
- a transmitter configured for installation and use on a vehicle, and configured to transmit phase modulated continuous wave radio signals, wherein the continuous wave radio signals are phase modulated via a spreading code;
- a receiver configured for installation and use on the vehicle, and configured to receive phase modulated radio signals that include the transmitted radio signals reflected from objects in the environment, wherein the receiver is configured to down-convert the received radio signals;
- wherein the receiver comprises a first analog-to-digital converter (ADC) configured to convert the down-converted received radio signals into received samples, and wherein the received samples are time domain received samples;
- wherein the receiver comprises a first Fourier transform module configured to convert the time domain received samples into frequency domain received samples;
- wherein the receiver comprises a product module configured to multiply the frequency domain received radio signals with frequency domain samples associated with the spreading code, wherein the product module is configured to output processed samples; and
- wherein the receiver further comprises an inverse Fourier transform module configured to convert the samples related to the output of the product module from the frequency domain to the time domain, and wherein the converted samples are a correlation of the received samples to detect object distance.

24. The radar sensing system of claim 23, wherein the receiver further comprises a digital processing unit, and wherein the digital processing unit comprises the first Fourier transform module, and wherein the first Fourier transform module is configured to perform a fast Fourier transform operation.

25. The radar sensing system of claim 23, wherein the receiver is configured to produce time domain code samples from a signal associated with the spreading code, and wherein the receiver further comprises a second Fourier transform module configured to convert the time domain code samples into frequency domain code samples, and wherein the receiver is further configured to zero-pad the time domain code samples before they are converted into frequency domain code samples.

26. The radar sensing system of claim 25, wherein the receiver is configured to store the frequency domain code samples.

27. The radar sensing system of claim 25, wherein the product module is configured to multiply the spreading code samples in the frequency domain with the frequency domain received samples.

28. The radar sensing system of claim 23, wherein the receiver is configured to process a code sample before or after the Fourier transform before the code sample is multiplied by the frequency domain samples of the received radio signals, and wherein the processing of code samples shifts the frequency of the sequence of code samples.

29. The radar sensing system of claim 23, wherein the receiver is configured to divide the received samples into blocks of samples, wherein a size of a block is smaller than a length of the spreading code, and wherein the receiver is configured to perform a block FFT correlation by processing the samples in a particular block of samples.

30. The radar sensing system of claim 29, wherein the receiver is configured to at least one of (i) compute at least two block FFT correlations in parallel, and (ii) offset or buffer a code and/or received signal to select a particular set of contiguous range bins for which correlations are desired.

* * * * *